(12) United States Patent
Agbabian et al.

(10) Patent No.: US 7,383,534 B1
(45) Date of Patent: Jun. 3, 2008

(54) CONFIGURATION SYSTEM AND METHODS INCLUDING CONFIGURATION INHERITANCE AND REVISIONING

(75) Inventors: Paul M. Agbabian, Los Angeles, CA (US); David R. Hertel, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 696 days.

(21) Appl. No.: 10/660,422

(22) Filed: Sep. 10, 2003

(51) Int. Cl.
G06F 9/44 (2006.01)
G06F 9/45 (2006.01)

(52) U.S. Cl. .................. 717/120; 717/108; 717/116
(58) Field of Classification Search ........ 717/114–117, 717/120–123, 108–110
See application file for complete search history.

(56) References Cited

U.S. PATENT DOCUMENTS

| | | | |
|---|---|---|---|
| 5,317,741 A * | 5/1994 | Schwanke | 717/120 |
| 5,440,742 A * | 8/1995 | Schwanke | 717/120 |
| 5,649,200 A * | 7/1997 | Leblang et al. | 717/122 |
| 5,862,386 A * | 1/1999 | Joseph et al. | 717/170 |
| 5,893,083 A | 4/1999 | Eshghi et al. | 706/45 |
| 5,898,872 A * | 4/1999 | Richley | 717/121 |
| 6,134,706 A * | 10/2000 | Carey et al. | 717/102 |
| 6,182,286 B1 * | 1/2001 | Sigal et al. | 717/122 |
| 6,223,342 B1 * | 4/2001 | George | 717/116 |
| 6,257,774 B1 * | 7/2001 | Stack | 717/110 |
| 6,266,773 B1 | 7/2001 | Kisor et al. | 713/200 |
| 6,298,445 B1 | 10/2001 | Shostack et al. | 713/201 |
| 6,321,338 B1 | 11/2001 | Porras et al. | 713/201 |
| 6,484,203 B1 | 11/2002 | Porras et al. | 709/224 |
| 6,601,234 B1 * | 7/2003 | Bowman-Amuah | 717/108 |
| 6,604,110 B1 * | 8/2003 | Savage et al. | 707/102 |
| 6,718,535 B1 * | 4/2004 | Underwood | 717/101 |
| 6,925,470 B1 * | 8/2005 | Sangudi et al. | 707/102 |
| 6,986,102 B1 * | 1/2006 | Baer et al. | 715/514 |
| 7,127,700 B2 * | 10/2006 | Large | 717/100 |
| 7,194,730 B2 * | 3/2007 | Pramberger | 717/120 |
| 7,272,815 B1 * | 9/2007 | Eldridge et al. | 717/101 |
| 2002/0019945 A1 | 2/2002 | Houston et al. | |
| 2004/0193912 A1 | 9/2004 | Li et al. | 713/200 |

OTHER PUBLICATIONS

Schill et al, "configuration management for distributed object oriented application", IEEE CHI pp. 577-581, 1990.*

Adderio, Configuring software, reconfiguring memories: the influence of integrated systems on knowledge storage, retrieval and reuse, ACM SAC pp. 726-731, 2002.*

Render et al, "An object oriented model of software configuration management", ACM pp. 127-139, 1991.*

(Continued)

*Primary Examiner*—Anil Khatri
(74) *Attorney, Agent, or Firm*—Gunnison, McKay & Hodgson, L.L.P.; Forrest Gunnison

(57) ABSTRACT

A system includes a security management system for a plurality of managed products. The security management system stores configuration data for managed products and managed nodes in a directory. Configuration data is stored in the directory in the form of configuration objects and setting objects. A revision history of a configuration object and/or a setting object can be maintained. Inheritance between configuration objects is supported so that a configuration inheritance chain is available. To determine an effective configuration at a point in time, a parent-child inheritance merge process is used. To assist the parent-child inheritance process, name attributes and collision resolution mode attributes are used.

14 Claims, 34 Drawing Sheets

OTHER PUBLICATIONS

Nguyen et al, "An infrastructure for development of object oriented multi level configuration management services", ACM ICSE, pp. 215-224, 2005.*

Barrus, J., "*Intrusion Detection in Real Time in a Multi-Node, Multi-Host Environment*", Master's Thesis, Naval Postgraduate School, Monterey, CA, i-xii, pp. 1-79, Sep. 1997.

"*SNIA CIM Interoperability Demonstration Backgrounder*", Storage Networking Industry Association, pp. 1-2, 2002.

King, N. and Weiss, E., "*Network Forensics Analysis Tools (NFATs) Reveal Insecurities, Turn Sysadmins Into Systems Detectives*", Information Security, 8 pgs., Feb. 2002.

Trenum, G., "*Practical Requirement for Level 2 IDIC Exam*", 15 pgs.

Shimomura, T., "*Tsutomu Shimomura's Newsgroup Posting With Technical Detail of the Attack Described by Markoff in NYT*", Random Access, 10 pgs., Oct. 12, 1997.

"*Dragon 5, An Intrusion Detection System for the Enterprise*", 5 pgs.

Stevens, W., The Protocols, TCP/IP Illustrated, vol. 1, Addison Wesley Longman, Inc., Reading, MA, pp. vii-xii, 7, 8, 1994.

Sinclair, C., Pierce, L., and Matzner, S., "*An Application of Machine Learning to Network Intrusion Detection*", The University of Texas at Austin, Austin, TX, pp. 1-7.

Butterworth, J., "*Practical Portion of Intrusion Detection Immersion Curriculum*", 10 pgs.

Kobi, H., "*Beyond SNMP: The Benefits of Collecting Network Event Logs*", Technical White Paper, Network Intelligence™ Corporation, Walpole, MA, pp. 1-10, Jun. 2002.

Harp, S., Geib, C., Goldman, R., Heimerdinger, W., Thomas, V., and R.A. Kemmerer Associates, "*Argus: An Architecture for Cooperating Intrusion Detection and Mitigation Applications*", Honeywell Technology Center, 18 pgs.

"*SNIA Storage Management Initiative CIM/WBEM Technology Backgrounder*", Storage Networking Industry Association, pp. 1-2, 2002.

Hughes, K. and Wohlferd, D., "*Say Goodbye to Quirky APIs: Building a WMI Provider to Expose Your Object Info*", pp. 1-16 [online]. Retrieved on Dec. 24, 2002. Retrieved from the internet: URL:http://msdn.microsoft.com/msdnmag/issues/0500/wmiprov/print.asp.

"*Common Information Model (CIM) Specification*", Version 2.2, Distributed Management Task Force, Inc., Portland, OR, pp. I-VI, 1-97, Jun. 14, 1999.

Davis, J., "*WBEM Services Specification JSR-0048*", Java One, Sun's 2001 Worldwide Java Developer Conference, pp. 1-19, 2001.

Bhat, G., "*WBEM Services API and Examples*", Java One, Sun's 2001 Worldwide Java Developer Conference, pp. 20-29, 2001.

Westerinen, A., "*Modeling Information in CIM*", Java One Sun's 2001 Worldwide Java Developer Conference, pp. 31-43, 2001.

Ptacek, T. and Newsham, T., "*Insertion, Evasion, and Denial of Service: Eluding Network Intrusion Detection*", Secure Networks, Inc., pp. 1-63, Jan. 1998.

Yang, J., Ning, P., Wang, X., and Jajodia, S., "*Cards: A Distributed System for Detecting Coordinated Attacks*", Center for Secure Information Systems, George Mason University, Fairfax, VA, pp. 1-10, 2000.

Magers, D., "*Packet Sniffing: An Integral Part of Network Defense*", 9 pgs., May 9, 2002.

Sinclair, C., Pierce, L., and Matzner, S., "*An Application of Machine Learning to Network Intrusion Detection*", The University of Texas at Austin, Austin, TX, pp. 1-7, 1999.

Kobi, H., "*Beyond SNMP: The Benefits of Collecting Network Event Logs*", Technical White Paper, Network Intelligence® Corporation, Walpole, MA, pp. 1-10, Jun. 2002.

Barrus, J. and Rowe, N., "*A Distributed Autonomous-Agent Network-Intrusion Detection and Response System*", Proceedings of the 1998 Command and Control Research and Technology Symposium, Monterey, CA, Jun.-Jul. 1998, 12 pgs.

Frincke, D., Tobin, D., McConnell, J., Marconi, J., and Polla, D., "*A Framework for Cooperative Intrusion Detection*", Center for Secure and Dependable Software, University of Idaho, Moscow, ID, 13 pgs, 1998.

"*Managing Your Network With HP OpenView Network Node Manager*", Hewlett-Packard Company, Fort Collins, CO, pp. 1-675, May 2002.

"*HP OpenView Communications Event Correlation Services Developer's Guide and Reference*", Hewlett-Packard Company, Fort Collins, CO, pp. 1-150, Apr. 2001.

"*HP OpenView Communications Event Correlation Services SNMP Module*", Hewlett-Packard Company, Fort Collins, CO, pp. 1-62, Apr. 2001.

"*HP OpenView Communications Event Correlation Services Administrator's Guide*", Hewlett-Packard Company, Fort Collins, CO, pp. 1-121, Apr. 2001.

Agbabian, P., U.S. Appl. No. 10/660,225, filed Sep. 10, 2003, entitled "Security Management System Including Feedback and Control", 287 pgs.

* cited by examiner

| Configuration Object for Scanner | |
|---|---|
| Caption | |
| Description | |
| Name (Key) | Default |
| SequenceName | Default |
| SequenceRevision | 20030701120000.000Z |
| DN_setting | orderedCimKeys="Symc_Setting.SettingID=Main",<br>cn=Settings,<br>orderCimKeys="Symc_SoftwareFeature.Name=Scanner",<br>orderedCimKeys="CIM_Product.IdentifyingNumber=3000<br>   Name=Demo SKUNumber=S12345 Vendor=Symantec Version=1.0",<br>cn=Products,<br>ou=Applications,<br>o=symc_ses |
| DN_parent | |

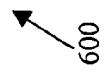

Fig.6A

| Setting object for Scanner | |
|---|---|
| Caption | |
| Description | |
| SettingID (Key) | Main |
| SequenceName | Main |
| SequenceRevision | 20030701120000.000Z |
| SettingText | <ScanEnabled>true</ScanEnabled> |
| SettingType | text/xml |

610

| Setting object for Scanner | | | | | | | |
|---|---|---|---|---|---|---|---|
| Caption | | | | | | | |
| Description | | | | | | | |
| SettingID (Key) | | | | | | | |
| SequenceName | | | | | | | |
| SequenceRevision | | | | | | | |
| SettingText | | | | | | | |
| SettingType | | | | | | | |

| Setting object for Scanner | |
|---|---|
| Caption | |
| Description | |
| SettingID (Key) | |
| SequenceName | Main |
| SequenceRevision | 20030701120000.000Z |
| SettingText | <ScanEnabled>true</ScanEnabled> |
| SettingType | text/xml |

610A

| Setting object for Scanner | |
|---|---|
| Caption | |
| Description | |
| SettingID (Key) | Main@ 20030701120000.000Z |
| SequenceName | Main |
| SequenceRevision | 20030701120000.000Z |
| SettingText | <ScanEnabled>true</ScanEnabled> |
| SettingType | text/xml |

| Setting object for Scanner | |
|---|---|
| Caption | |
| Description | |
| SettingID (Key) | Main |
| SequenceName | Main |
| SequenceRevision | 20030701120500.000Z |
| SettingText | <LogEnabled>false</LogEnabled> |
| SettingType | text/xml |

610REV

Fig.6F

| Setting object for Scanner | |
|---|---|
| Caption | |
| Description | |
| SettingID (Key) | Main |
| SequenceName | Main |
| SequenceRevision | 20030701120000.000Z |
| SettingText | \<ScanEnabled\>true\</ScanEnabled\><br>\<LogEnabled\>false\</LogEnabled\> |
| SettingType | text/xml |

710

| Setting object for Scanner | |
|---|---|
| Caption | |
| Description | |
| SettingID | Server1 |
| SequenceName | Server1 |
| SequenceRevision | 20030703120500.000Z |
| SettingText | <ForwardingServer>server2</ForwardingServer> |
| SettingType | text/xml |

910

| Config object for Scanner | |
|---|---|
| Caption | |
| Description | |
| Name (Key) | Custom |
| SequenceName | Custom |
| SequenceRevision | |
| DN_setting | |
| DN_parent | orderedCimKeys="CIM_Configuration.Name=Default",<br>cn=Configs,<br>orderedCimKeys="Symc_SoftwareFeature.Name=Scanner",<br>orderedCimKeys="CIM_Product.IdentifyingNumber=3000<br>Name=Demo SKUNumber=S12345 Vendor=Symantec Version=1.0",<br>cn=Products,<br>ou=Applications,<br>o=symc_ses |

| | |
|---|---|
| Config object for Scanner | |
| Caption | |
| Description | |
| Name (Key) | Custom |
| SequenceName | Custom |
| SequenceRevision | 20030701120700.000Z |
| DN_setting | orderedCimKeys="Symc_Setting.SettingID=Main",<br>cn=Settings,<br>orderCimKeys="Symc_SoftwareFeature.Name=Scanner"<br>orderedCimKeys="CIM_Product.IdentifyingNumber=3000 Name=Demo SKUNumber=S12345 Vendor=Symantec Version=1.0",<br>cn=Products,<br>ou=Applications,<br>o=symc_ses |
| DN_parent | orderedCimKeys="CIM_Configuration.Name=Default",<br>cn=Configs,<br>orderedCimKeys="Symc_SoftwareFeature.Name=Scanner",<br>orderedCimKeys="CIM_Product.IdentifyingNumber=3000 Name=Demo SKUNumber=S12345 Vendor=Symantec Version=1.0",<br>cn=Products,<br>ou=Applications,<br>o=symc_ses |

```xml
<!-- derived -->                                    1210        1220                                   1200
<configuration>
  <setting sesa-name="rules">                                                            1230_1
    <rule sesa-name="Foo">                                                               1240_1
      <Enabled>true</Enabled>                   1250_1
      <Source>                                     1260_1                                1240_2
        <IP sesa-name="=">1.0.0.0</IP>             1250_2
        <IP sesa-name="=">3.0.0.0</IP>             1250_3
      </Source>                                    1260_2                                1240_3
      <Action sesa-resolve="usederived">
        <ActionType>Deny</ActionType>              1250_4                1250_6
      </Action>                                    1260_3
      <AlertsEnabled value="true"/>                1250_5                                1240_4
      <AlertMessage sesa-resolve="accumulate">Drat!</AlertMessage>                       1240_5
    </rule>                                        1230_2
    <rule sesa-name="Bar">
      <When sesa-resolve="usederived">             1240_6
        <Time>Weekdays</Time>                      1250_7
      </When>                                      1260_4
    </rule>                                        1330_3
    <rule sesa-name="Baz">
      <Source>                                     1260_5                                1240_7
        <IP sesa-name="=">6.0.0.0</IP>             1250_8
      </Source>                                                                          1240_8
      <Destination sesa-resolve="usederived">
        <IP>7.0.0.0</IP>                           1250_9                1260_6
      </Destination>                                                                     1240_9
      <When sesa-resolve="usederived">
        <Time>Weekdays</Time>                      1250_10
        <Time>Holidays</Time>                      1250_11               1260_7
      </When>                                      1260_8
      <Action sesa-resolve="usederived">                                                 1240_10
        <ActionType>Allow</ActionType>             1250_12
      </Action>                                    1260_9
    </rule>
  </setting>
</configuration>
```

Fig. 12

```
<!-- base -->
<configuration>
    <setting sesa-name="rules">
        <rule sesa-name="Foo">
            <Enabled>false</Enabled>
            <Source>
                <IP sesa-name="=">2.0.0.0</IP>
                <IP sesa-name="=">1.0.0.0</IP>
            </Source>
            <Destination sesa-resolve="usederived">
                <IP>3.0.0.0</IP>
            </Destination>
            <When sesa-resolve="usederived">
                <Time>Anytime</Time>
            </When>
            <Action sesa-resolve="usederived">
                <ActionType>Allow</ActionType>
            </Action>
            <AlertsEnabled value="false" />
            <AlertMessage sesa-resolve="accumulate">Uh-oh!</AlertMessage>
        </rule>
        <rule sesa-name="Bar">
            <Source>
                <IP sesa-name="=">4.0.0.0</IP>
            </Source>
            <Destination sesa-resolve="usederived">
                <IP>5.0.0.0</IP>
            </Destination>
            <Action sesa-resolve="usederived">
                <ActionType>Allow</ActionType>
            </Action>
        </rule>
    </setting>
</configuration>
```

Fig. 14

```xml
<!-- merged -->
<configuration>
  <setting sesa-name="rules">
    <rule sesa-name="Foo">
      <Enabled>true</Enabled>
      <Source>
        <IP sesa-name="=">2.0.0.0</IP>
        <IP sesa-name="=">1.0.0.0</IP>
        <IP sesa-name="=">3.0.0.0</IP>
      </Source>
      <Destination sesa-resolve="usederived">
        <IP>3.0.0.0</IP>
      </Destination>
      <When sesa-resolve="usederived">
        <Time>Anytime</Time>
      </When>
      <Action sesa-resolve="usederived">
        <ActionType>Deny</ActionType>
      </Action>
      <AlertsEnabled value="true"></AlertsEnabled>
      <AlertMessage sesa-resolve="accumulate">Uh-oh!</AlertMessage>
      <AlertMessage sesa-resolve="accumulate">Drat!</AlertMessage>
    </rule>
    <rule sesa-name="Bar">
      <Source>
        <IP sesa-name="=">4.0.0.0</IP>
      </Source>
      <Destination sesa-resolve="usederived">
        <IP>5.0.0.0</IP>
      </Destination>
      <Action sesa-resolve="usederived">
        <ActionType>Allow</ActionType>
      </Action>
      <When sesa-resolve="usederived">
        <Time>Weekdays</Time>
      </When>
    </rule>
```

```xml
<rule sesa-name="Baz">
  <Source>
    <IP sesa-name="=">6.0.0.0</IP>
  </Source>
  <Destination sesa-resolve="usederived">
    <IP>7.0.0.0</IP>
  </Destination>
  <When sesa-resolve="usederived">
    <Time>Weekdays</Time>
    <Time>Holidays</Time>
  </When>
  <Action sesa-resolve="usederived">
    <ActionType>Allow</ActionType>
  </Action>
</rule>
</setting>
</configuration>
```

Fig. 17B

CONFIGURATION SYSTEM AND METHODS INCLUDING CONFIGURATION INHERITANCE AND REVISIONING

BACKGROUND OF THE INVENTION

1. Field of the Invention

The present invention relates generally to managing applications on a computer network, and more particularly to managing applications on a computer network using configuration inheritance and revisioning.

2. Description of Related Art

Multi-vendor security services and products typically provide network security. Each security service and product typically must be configured and reconfigured to maintain network security. Typically, each vendor for a security service and product utilizes various settings to establish a configuration. Some of these settings may be established at the time a product is installed. A user, a group, or update features of the product may establish other settings.

Unfortunately, it is difficult, if not impossible, for a network security administrator to know the configuration of each product, each device, at the various tiers that exist on the network at a given moment in time. Consequently, monitoring and changing configurations in view of a security threat is a time consuming and difficult task.

While there may be a well-defined security policy, assuring the policy is properly implemented at all times on the network is difficult. The security administrator may have no idea of how various products, devices etc. were configured at the time of an attack compared with how the same elements are configured at the time it was determined that an attack occurred. Consequently, it is unclear what must be done to implement the security policy.

This problem is exacerbated because there is not a common technique or structure for maintaining configuration data for the wide variety of products, devices and groupings of products and devices found in the complex enterprise networks that exist today. For this reason, an integrated approach to configuring devices and products to support network security management is very complex and difficult to implement. Moreover, an approach developed for one enterprise network many not be applicable to another enterprise network due to the differences in the network structure, the security products and services, and the use of the network.

SUMMARY OF THE INVENTION

In one embodiment of the present invention, a computer memory structure includes a configuration object, for a managed product, having a key field and setting object pointer attribute. In other embodiments, the configuration object also includes a sequence name field, and a sequence revision field. The configuration object further includes a parent configuration object pointer attribute. Upon the parent configuration object pointer attribute including a pointer to another configuration object, the configuration object is a child configuration object.

In yet another embodiment, the computer memory structure also includes a setting object. The setting object is addressed by a pointer of the setting object pointer attribute. In still yet other embodiments, the setting object includes a key field, a setting data field, a sequence name field. and a sequence revision field In one embodiment, a configuration for a managed product is specified using a configuration object. A modification to the configuration for the managed product is represented by using a derived configuration object of the configuration object. The configuration object and the derived configuration object are an example of a configuration object inheritance chain.

The configuration object inheritance chain is processed to obtain an effective configuration for the managed product. This processing includes using a parent-child inheritance merge process.

In another embodiment, a string in a setting object is used to specify a setting for a managed product. The setting object is linked to a first configuration object for the managed product.

The first configuration object includes a first memory structure having:

a first name field storing a name wherein the name is a key for the first configuration object; and a first sequence revision field storing a first timestamp for the configuration object.

Generating a second configuration object includes creating a second memory structure having a second name field and a second sequence revision field. In generating the second configuration object, the first timestamp is copied from the first sequence revision field to the second sequence revision field. Also, a second name is stored in the second name field. The second name includes a combination of the name and the first time stamp. The first timestamp in the first sequence revision field is overwritten with a second timestamp.

In still another embodiment, a string in a setting object is used to specify a setting for a managed product. The string is an extensible markup language string. The setting object is linked to a first configuration object for the managed product.

The sting includes for example a name attribute with a namespecifier in a start tag in the string. In one instance, an operation associated with the namespecifier appends a literal name to a name of the start tag. In another instance, an operation associated with the namespecifier appends current element text to a name of the start tag. In still another instance, an operation associated with the namespecifier appends a current element attribute value to a name of the start tag. In still yet another instance, an operation associated with the namespecifier appends a name of a subelement tag to a name of the start tag. In a further instance, an operation associated with the namespecifier appends text of a subelement to a name of the start tag. In another further instance, an operation associated with the namespecifier appends a subelement attribute value to a name of the start tag.

Still yet another method includes generating an effective configuration for a managed product from a configuration inheritance chain. The generating an effective configuration includes getting a mark-up language string for a most-derived configuration object. The generating an effective configuration further includes converting the mark-up language string for the most-derived configuration object to a derived tree structure having nodes. A plurality of nodes in the derived tree structure includes collision detection names.

The generating an effective configuration also includes getting a mark-up language string for a parent configuration object of the most-derived configuration object and converting the mark-up language string for the parent configuration object to a base tree structure having nodes. A plurality of nodes in the base tree structure includes collision detection names. Next, the generating an effective configuration combines the derived tree structure and the base tree structure, by resolving at least one collision between a node in the derived tree structure having a collision detection name and a node in the base tree structure having the collision detection name, to form a merged tree structure.

A further method includes using an extensible markup language string in a setting object to specify a setting for a managed product, and including a name attribute in at least one start tag in a XML string.

In one embodiment, this further method also includes including a collision resolution mode attribute for at least one start tag in the XML string.

In one embodiment, a computer-program product comprising a computer-readable medium containing computer program code for a method comprising:
  specifying a configuration for a managed product using a configuration object; and
  representing a modification to the configuration for the managed product using a derived configuration object of the configuration object.

For this one embodiment, a structure includes
  means for specifying a configuration for a managed product using a configuration object; and
  means for representing a modification to the configuration for the managed product using a derived configuration object of the configuration object.

In another embodiment, a computer-program product includes a computer-readable medium containing computer program code for a method including:
  using a string in a setting object to specify a setting for a managed product; and
  linking the setting object to a first configuration object for the managed product.

For this another embodiment, a structure includes:
  means for using a string in a setting object to specify a setting for a managed product; and
  means for linking the setting object to a first configuration object for the managed product.

For yet another embodiment, a structure includes:
  means for getting a mark-up language string for a most-derived configuration object; and
  means for converting the mark-up language string for the most-derived configuration object to a derived tree structure having nodes wherein a plurality of nodes in the derived tree structure include collision detection names.

In a still further embodiment, a computer-program product includes a computer-readable medium containing computer program code for a method including:
  using an extensible markup language string in a setting object to specify a setting for a managed product; and
  including a name attribute in at least one start tag in the XML string.

BRIEF DESCRIPTION OF THE DRAWINGS

FIG. 6A is a more detailed example of one embodiment of a configuration object for a managed product according to the principles of this invention.

FIG. 6C illustrates a first step in generation of a revised setting object for the managed product according to one embodiment of this invention.

FIG. 6E illustrates the completed new setting object for the managed product according to one embodiment of this invention.

FIG. 6F illustrates the completed revised trunk setting object for the managed product according to one embodiment of this invention.

FIG. 9B illustrates a first step in generation of a child configuration object for the configuration object of FIG. 6A according to one embodiment of this invention.

FIG. 9C illustrates the completed child configuration object for the managed product according to one embodiment of this invention.

FIG. 12 is an example of an XML string that is generated in one embodiment of the get trunk object and setting objects operation of FIG. 11 according to the principles of this invention.

FIG. 14 is an example of an XML string that is generated in one embodiment of the get parent object and setting objects operation of FIG. 11 according to the principles of this invention.

FIGS. 17A and 17B are an XML string that is generated from the DOM tree of FIGS. 16A and 16B according to one embodiment of the present invention.

Figure 1:
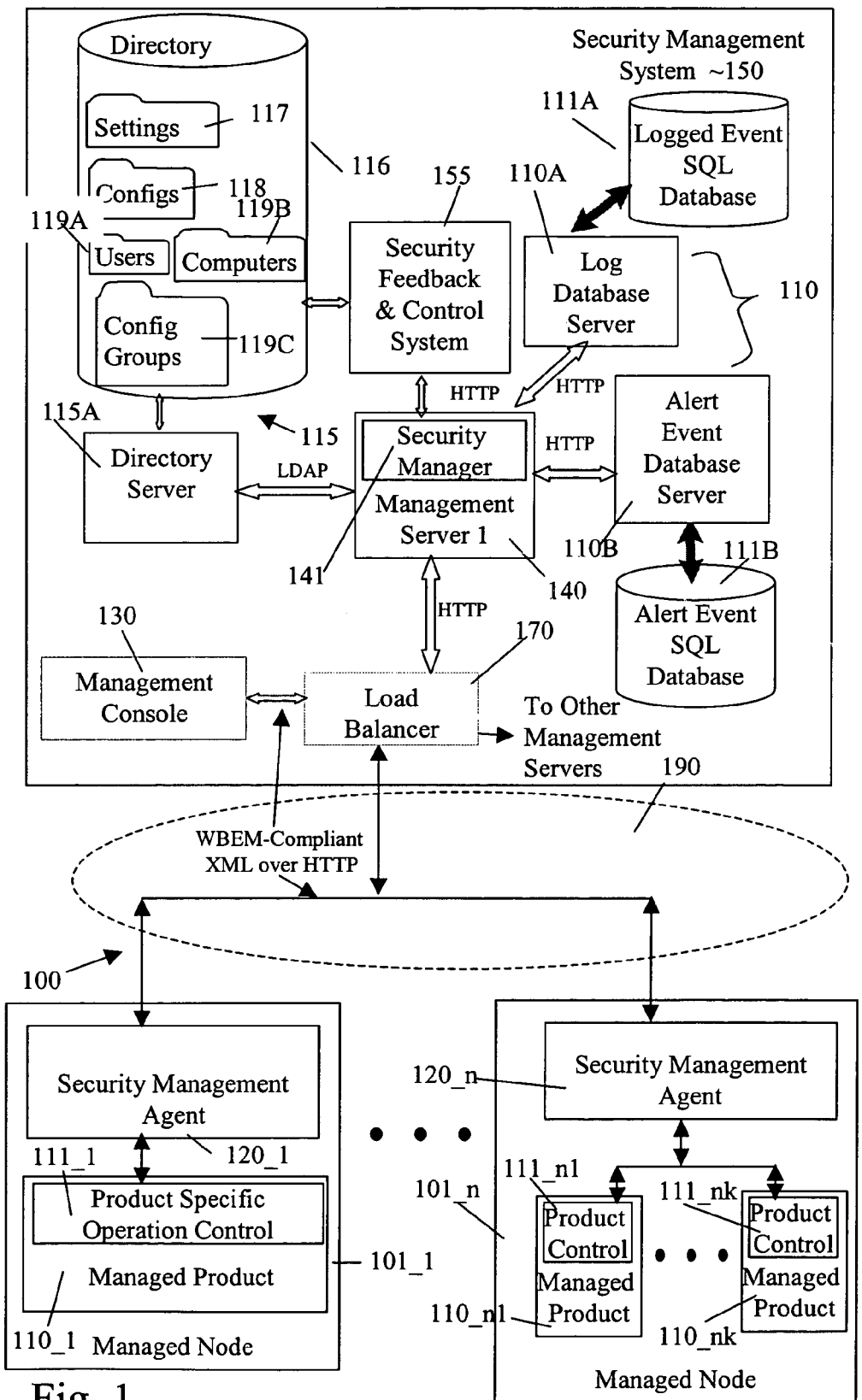
FIG. 1 is an illustration of a system that utilizes a configuration system and methods including configuration inheritance and revisioning for managed products according to one embodiment of the present invention.

In the drawings and the following detailed description, elements with the same reference numeral are the same or equivalent elements. Also, for three digit reference numerals, the first digit of the reference numeral is the figure number in which the corresponding element first appears. For four digit reference numerals, the first two digits of the reference numeral are the figure number in which the corresponding element first appears.

DETAILED DESCRIPTION

A system 100 (FIG. 1) includes a security management system 150 for a plurality of managed products 110_1 to 110_nk. Security management system 150 stores configuration data for managed products 110_1 to 110_nk in a directory 116. Configuration data is stored in directory 116 in the form of configuration objects 118 and setting objects 117, in one embodiment. In one embodiment, the operational parameters are included in one or more setting objects that are addressed by a configuration object, e.g., the configuration object includes pointers to the setting objects.

Configuration objects may be assigned to an entity in computers 119B, an entity in users 119A, or an entity in configuration groups 119C. As explained more completely below, each of a computer, a user, and a configuration group may be assigned one configuration object for a software feature of a managed product.

Inheritance between configuration objects 118 is supported. This allows an administrator to create configuration objects that are incomplete, and therefore more reusable.

For example, a base (parent) configuration object may contain operational parameters that are appropriate for many managed products, and a derived (child) configuration object may supply additional required parameters that are perhaps managed product specific. The effective configuration, in this example, is the configuration obtained by the merger of the parent and child configuration objects.

As explained more completely below, a parent-child inheritance merge process resolves collisions between elements having the same collision detection name for each pair of parent/child configuration objects and merges the pair of configuration objects to obtain a merged configuration. When the last configuration object in a family has been processed, the resulting merged configuration is the effective configuration.

To assist the parent-child inheritance process, a name attribute having a namespecifier is utilized. Based upon the value of the namespecifier, a collision detection name for an element is generated by combining a string selected by the value of the namespecifier with a name of the element. In addition, a collision-mode-resolution attribute is also used. In one embodiment, the value of the collision-mode-resolution attribute determines whether an element from the parent configuration, an element from the child configuration, a merger of the elements from the parent and child configurations, or an accumulation of the elements from the parent and child configuration are used in the effective configuration.

In one embodiment, once a configuration object is created, the configuration object is not modified. Rather, to modify a configuration, a new configuration object is created with the same name as the original configuration object. The name of the original configuration has a timestamp concatenated with the name. Both the new and the original configuration objects are saved.

Similarly, once a setting object is created, the setting object is not modified in this embodiment. To modify a setting, a new setting object is created. Both the original and the new setting objects are saved.

Hence, if this practice is continued over time, a sequence of objects is obtained with the same base name. These sequences are revision histories. Hence, the properties of the configuration objects and settings objects make it possible to maintain a configuration revision history that provides a historical record of configuration changes and setting changes.

When it is determined that a security problem has occurred in system 100, the configuration and setting objects in use for a particular managed product may be different from the configuration and setting objects that were in use at the time of occurrence of the security problem. As described more completely below, the configuration revision history and the configuration inheritance, if used, allows an administrator or a security feedback and control system 155 to determine exactly what operational parameters a managed product was using at any time in the past for a particular user, computer and/or configuration group.

In particular, a timestamp of a security event is used in determining what parameters allowed the security event to occur. A name of the configuration object that the managed product was using at the time of the event is found by looking for other security events describing configuration reloads. Because the configuration object with this name may have been edited since the time of the security event, it is necessary to recover the prior state of the configuration.

The configuration object revision sequence with this name is loaded in memory and the configuration object with a timestamp prior to and closest to the timestamp is selected as the configuration object used at the time of the event. This configuration object is called the event configuration object for reference.

The setting objects for the event configuration object are retrieved. For each retrieved setting object that is part of a setting object revision sequence, the setting object in the sequence with a timestamp prior to and closest to the event timestamp is selected.

Thus, the event configuration object is converted to a data string by selecting the correct revision of each of its setting objects and concatenating the data string from each setting. The resulting configuration string is merged with its parent configuration, and so on with the grandparent, great-grandparent, etc. using a parent-child inheritance merge process, as described below.

Prior to considering the configuration inheritance and revision system further, one embodiment of system 100 is developed to assist in the description of the configuration inheritance and revision system. However, the configuration and inheritance system is not limited to this embodiment of system 100. In general, in view of this description, the configuration revision and inheritance system can be implemented in any system that utilizes a tagged computer language in defining configurations and settings for applications executed on the system.

In the embodiment of FIG. 1, system 100 is implemented using an N-tiered architecture. There are at least two database server tiers. A first database tier 110 manages repositories for event data logging and alert event data logging. First database tier 110 includes a log database server 110A with a logged event SQL database 111A and an alert event database server 110B with alert event SQL database 111B.

A second database tier 115 is a directory tier, where managed product registration, configuration, and security policy information is maintained. Second data base tier includes a directory server 115A and a directory 116. Second database tier 115 is completely independent from first database tier 110 providing different services and using completely different methods and data management tools.

A middle tier of the N-tiered architecture includes at least one management server 140 that brokers requests for services made by managed products installed on network 190. The middle tier in some embodiments includes a plurality of management servers.

Management server 140 receives, interprets and serializes all the service requests made via events from managed products 110_1 to 110_nk and routes the events to the appropriate event sink or sinks, e.g., a database server, whether it is a directory server 115A, log database server 110A, an alert event database server 110B, and/or security and feedback control system 155.

Management server 140 contains the logic for answering all of the "what," "where," and "how" questions related to the requested service. This means that the calling managed product has been completely freed from needing to know anything about the location and implementation of the service being called. Thus, a separate middleware tier has been established.

Yet another tier in the N-tiered architecture further separates managed products 110_1 to 110__nk from management operations. This tier is a security management agent tier. In this embodiment, each security management agent 120__i in a plurality of security management agents 120_1 to 120__n, where n is an integer, is associated with a corresponding managed node 101__i in a plurality of managed nodes 101_1 to 101__n. Typically, each managed node 101__i includes at least one managed product 110__j.

A managed product 110__j is used in a generic sense and can be a physical device or computer program code in the form of an application or an operating system, for example. Sometimes a managed product is referred to as an application. In one embodiment, managed products include but are not limited to any one of, or any combination of anti-virus applications, firewalls, intrusion detection systems, vulnerability assessment applications, hubs, routers, switches, computers including servers, workstations, and personal computers, and access control lists.

In the example of FIG. 1, managed node 101_1 includes a single managed product 110_1, while managed node 101__n includes k-managed products, where k is an integer. Each managed product 110__j, where j ranges from one to the total number of managed products, includes a product specific operation control module 111__j that is used in communicating with managed product 110__j and with a security management agent 120__m, where m ranges from one to n in FIG. 1.

Each managed product 110__j registers with security management agent 120__m and with security management system 150. Managed product 201__j provides security management system 150 with specified information such as identification and configuration data. In one embodiment, this information is provided using a schema in the eXtensible Markup Language (XML), hereinafter XML.

Yet another tier in N-tier security system management architecture is a management console 130 that provides administrators with navigation, configuration and reporting capabilities needed to administer all managed products installed on network 190. In one embodiment, a web browser-based user interface is supplied for management console 130. Management console 130 runs independently from all other security management system elements and communicates directly with directory 116 containing product policy and configuration data and with the log and alert event databases 110A, 110B.

In one embodiment, administrative operations available through management console 130 include (1) browsing and selective viewing of managed objects, including systems on the network, sometimes called managed nodes, on which one or more managed products has been installed, (2) changing policies and configurations for deployed managed products, (3) performing queries and generating reports on managed objects, including managed products, and (4) browsing and selectively viewing log and alert events generated from managed products, including the query and reporting capability associated with logging and event services.

The user interface for management console 130 is easy-to-use, supplies rapid and flexible navigation capabilities, and includes operations that permit administrators to operate on all members of selected collections of managed objects using a single, simple transaction dialog. View and command scope are available based on the authorizations granted to an administrator.

Because, in one embodiment, HTTP is used for all communication between managed products and services provided by security management system 150, one or more web servers are used in every interaction between a managed product and security management system 150. This is yet another tier in the architecture of security management system 150.

The N-tier architecture of security management system 150 has at its core a communication infrastructure comprised of (1) an extensible security management agent that resides on each system that hosts at least one managed product and (2) one or more management servers distributed around the target network environment that, as mentioned above, broker the requests for services sent by security management agents on behalf of managed products.

As explained in copending, commonly filed, and commonly assigned U.S. patent application Ser. No. 10/660,225, entitled "A SECURITY MANAGEMENT SYSTEM INCLUDING FEEDBACK AND CONTROL" of Paul M. Agbabian, which is incorporated herein by reference in its entirety, a managed product is registered with management server 140 by utilizing a product integration XML (PIX) file. Product integration data included in the PIX files includes a product name, a product identifier (ID), and a software feature identifier as well as settings and properties associated with the software feature(s) of the managed product. A software feature represents a particular function or capability of a managed product.

Figure 2A:
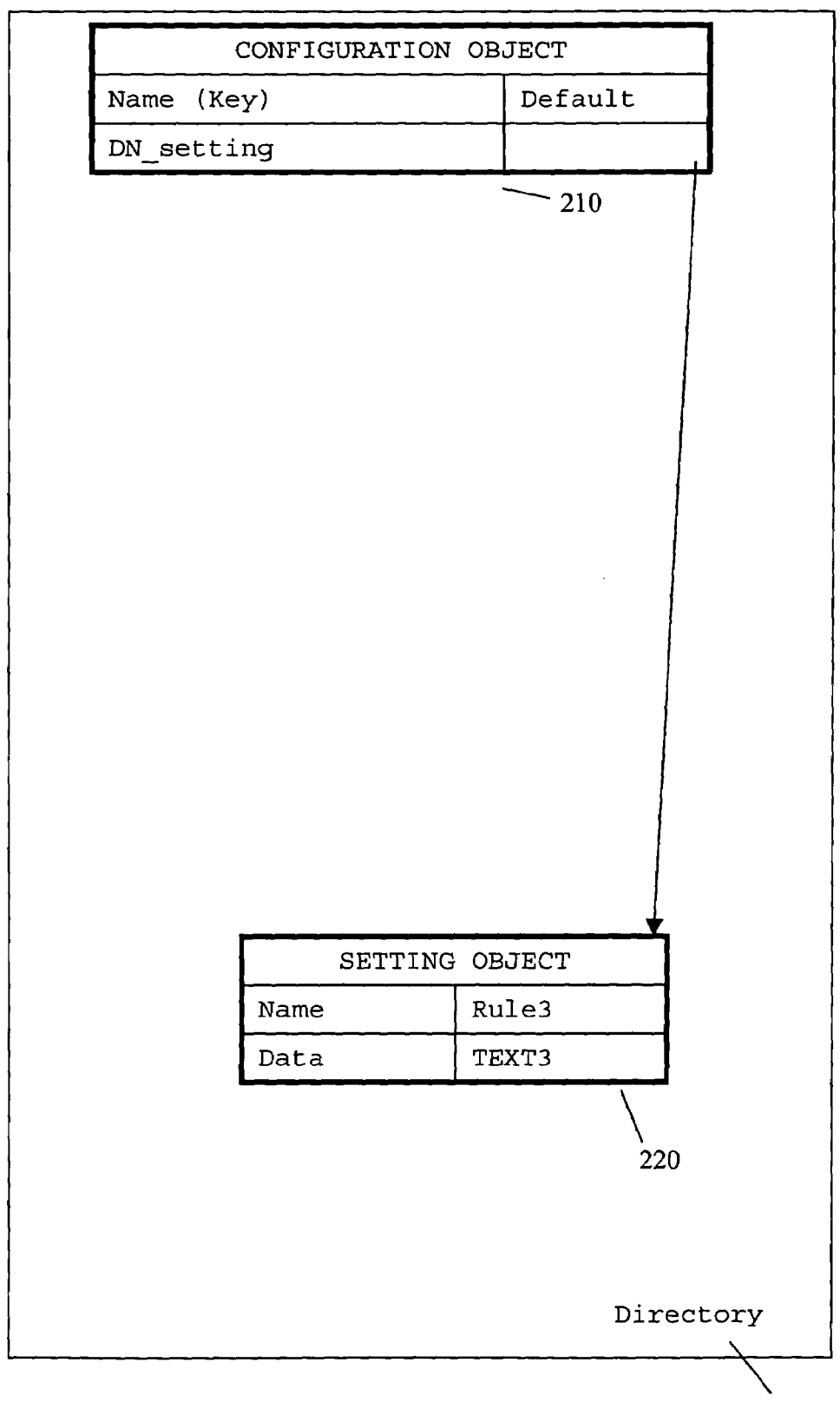
FIG. 2A illustrates one embodiment of configuration and setting object memory structures that are used for a configuration of a managed product according to the present invention.

When a managed product 110_*j* is registered with management server 140, a default configuration object 210 (FIG. 2A) is created in directory 116. Also, a default setting object(s), which are referenced by configuration object 210, e.g., setting object 220, is created. A console plug-in module is also installed. The plug-in module manages the creation and maintenance of configuration objects and setting objects and their relationships, and allows administrators to view and edit the configuration data via standard GUI controls on console 130.

Herein, a configuration object 210 represents a certain behavior or desired functional state for a software feature of managed product 110_*j*. In general, a configuration object is a grouping of one or more settings. Each setting object contains parameter data for the software feature. Setting object 220 contains parameter data "TEXT3."

Configuration object 210 has a name "Default," that is stored in a configuration object field Name. The value stored in field Name is a database key in this embodiment. A configuration object may have a reference to a parent configuration object in a parent configuration pointer field DN_parent (not shown in FIG. 2A), which is interpreted as a configuration object from which the given configuration object inherits.

Setting object 220 contains a logical subset of the operational data needed to configure managed product 110_*j*. Setting object 220 has a name "Rule3," that is stored in a setting object name field Name. The value stored in setting object name field Name is a database key in this embodiment. Also, in this embodiment, parameter data "TEXT3" is stored in a setting object data field Data. In one embodiment, "TEXT3" is an eXtensible Markup Language (XML) string. The XML string may contain whatever information the managed product needs for a setting.

In the drawings, the name of field is shown as a reference numeral. This is for ease of interpretation only, and should not be interpreted to require the name field in the actual memory structure.

For each managed product 110_*j*, an administrator may create one or more configuration objects and one or more settings. Also, as described above, a configuration object may be applied to more than one managed product. Sometimes a configuration object is referred to as a managed product configuration object. This means that the managed product configuration object is associated with at least one managed product and possibly other managed products.

Figure 2B:
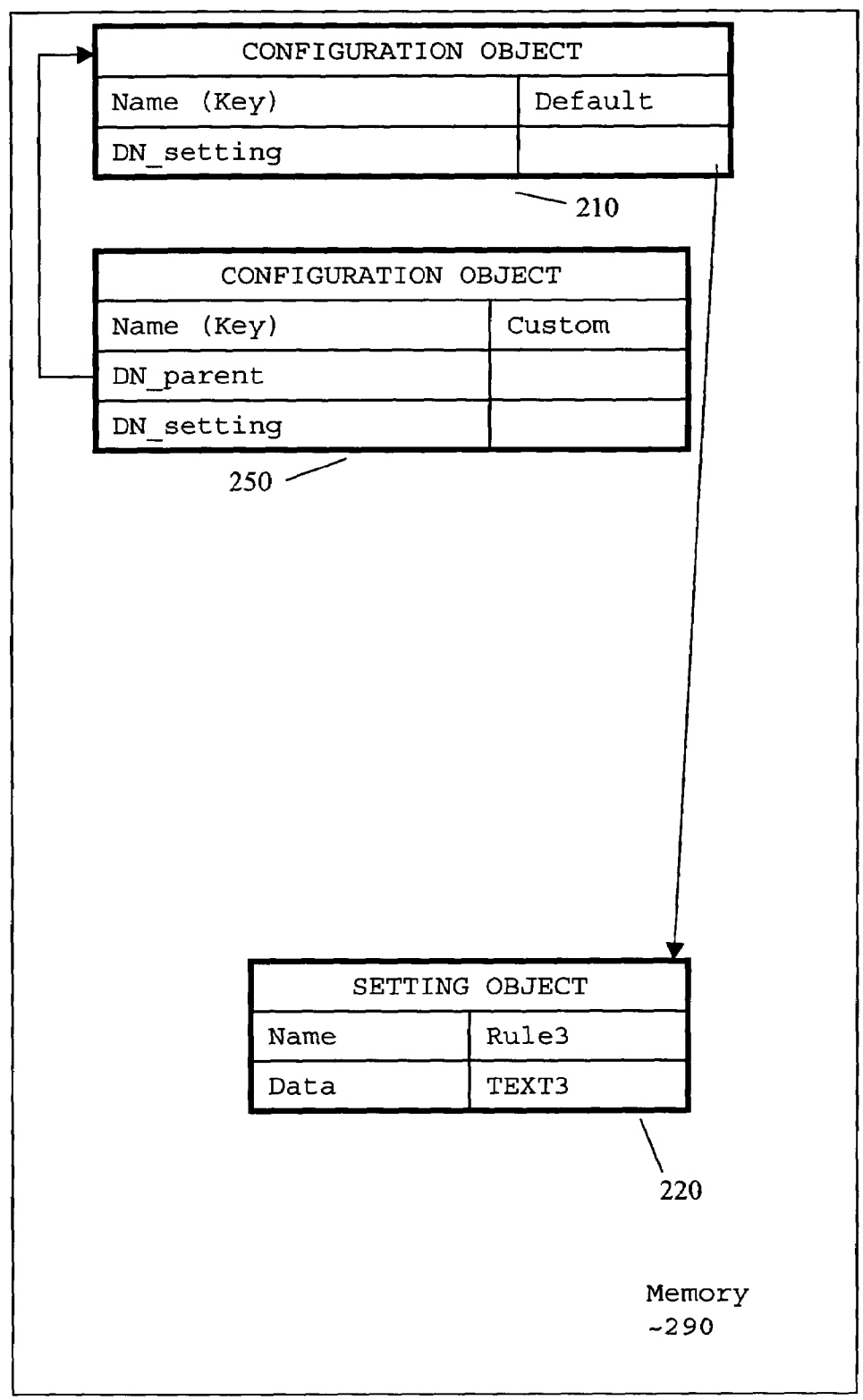
FIG. 2B illustrates one embodiment of creating a child configuration object memory structure according to the present invention.

In the example of FIG. 2B, the administrator wants to create a custom configuration. Hence, in response to administrator input, via the console GUI, requesting a new configuration object, configuration object 250 is generated with configuration object name Custom. Because configuration object 250 has a parent configuration object 210, a pointer to configuration object 210 is stored in a parent configuration pointer field DN_parent of configuration object 250.

Figure 2C:
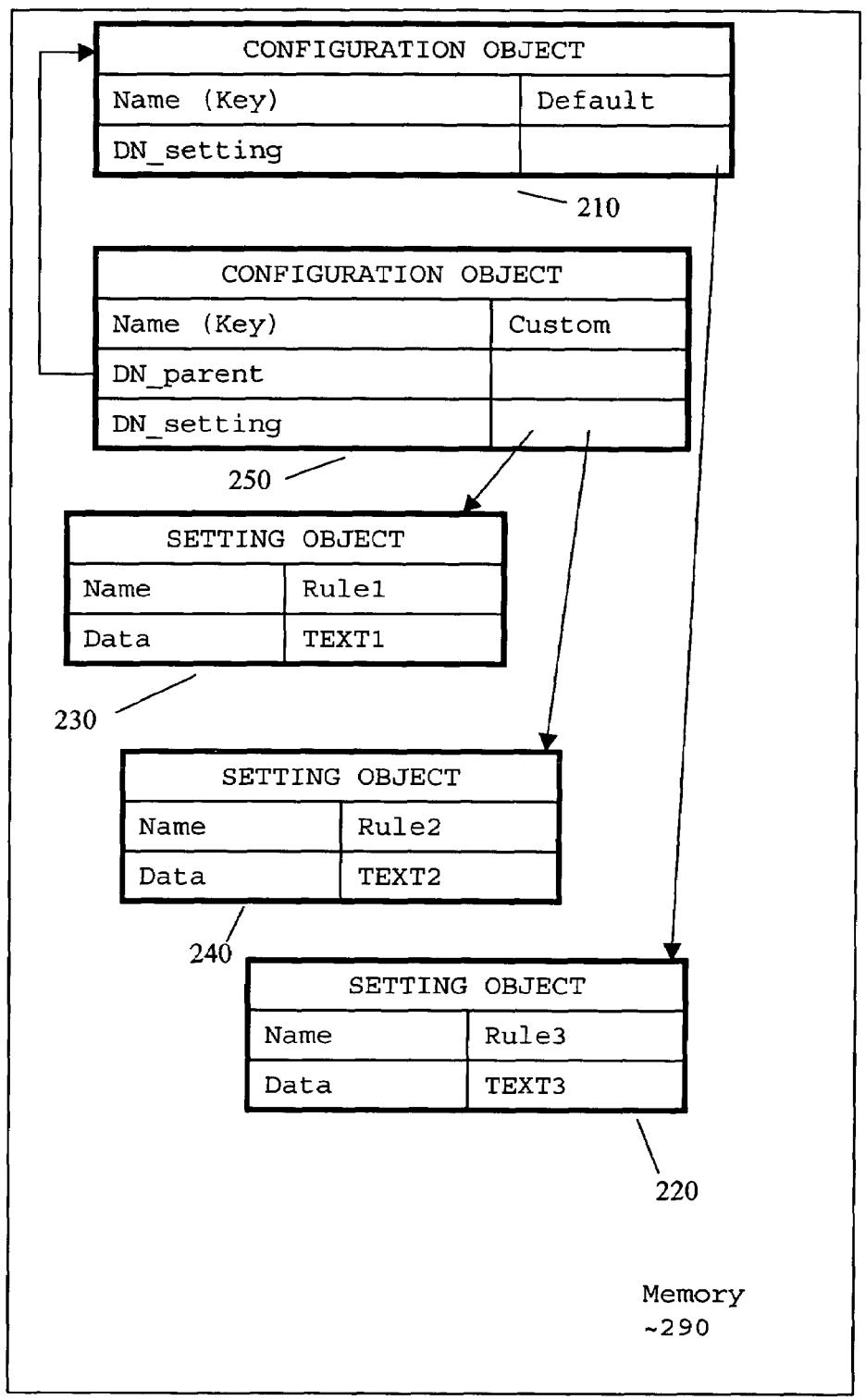
FIG. 2C illustrates the completed configuration inheritance chain that includes a child configuration object with two setting objects and a parent configuration with a single setting object according to one embodiment of the present invention.

As illustrated in FIG. 2C, in response to administrator directives, a pointer to setting 230 and a pointer to setting object 240 are added to configuration object 250. Setting object 230 has a name "Rule1" that is stored in a setting object name field Name. Also, in this embodiment, parameter data "TEXT1" is stored in a setting object data field Data of setting object 230. Setting object 240 has a name "Rule2" that is stored in a setting object name field Name. Also, in this embodiment, parameter data "TEXT2" is stored in a setting object data field Data of setting object 240.

Thus, child configuration object 250 includes two settings 230 and 240, while parent configuration object 210 still includes setting 220. The effective configuration using configuration objects 250 and 240 is determined using a parent-child merge process that is described below.

Returning to FIG. 2A assume that an administrator wishes to edit configuration object 210. In response to administrator input, via the console GUI, requesting to modify new configuration object 210. A new configuration object 210A (FIG. 2D) is created.

Figure 2D:
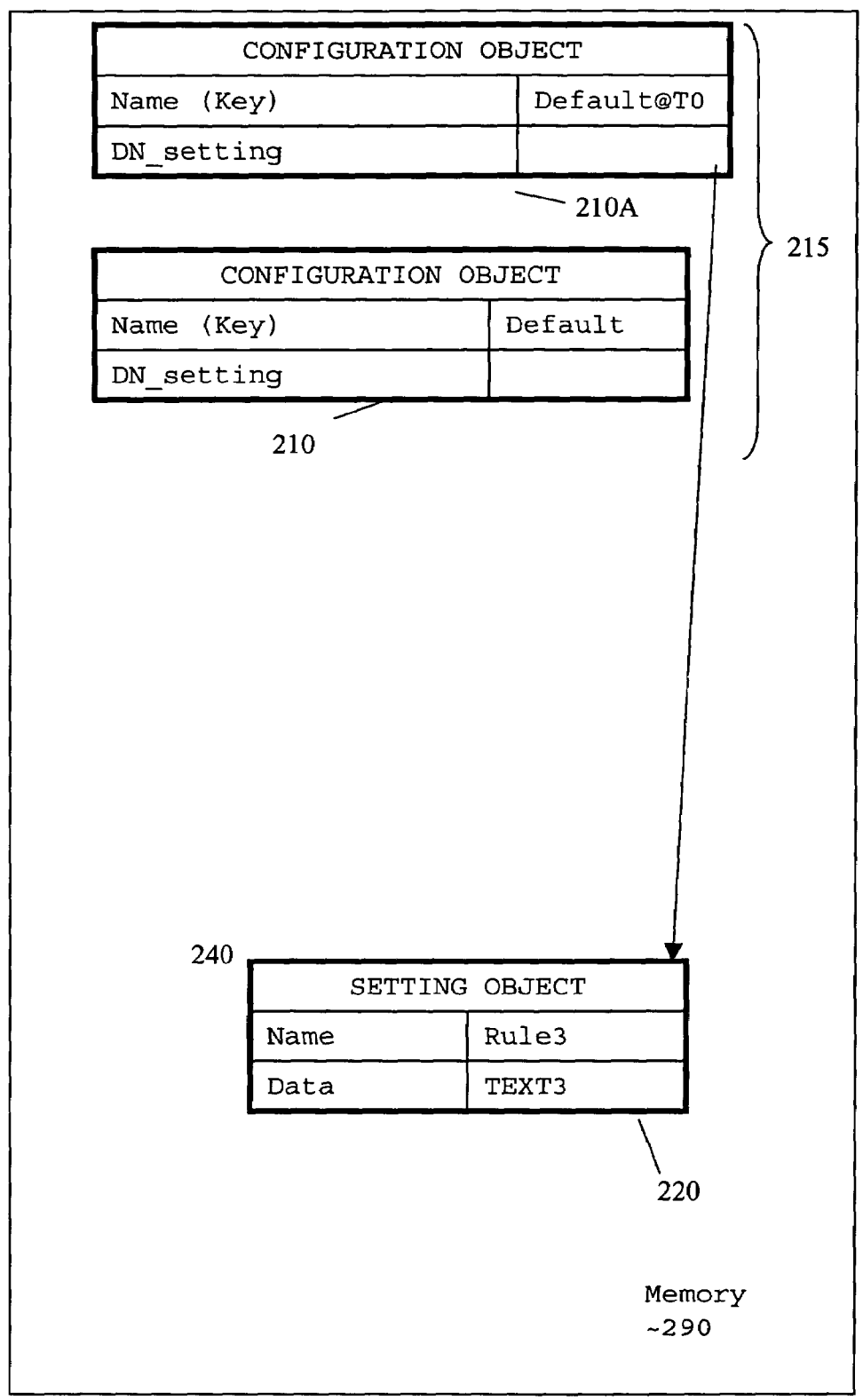
FIG. 2D illustrates a new configuration object being created in a configuration object revision sequence according to one embodiment of the present invention.

The properties of original configuration object 210 (FIG. 2A), except for the key property, are copied from configuration object 210 to configuration object 210A (FIG. 2D). The key property for configuration object 210A is the value of the original key concatenated with a timestamp of the time that original configuration object 210 (FIG. 2A) was last saved. Thus, in this example, the key for configuration object 210A is "Default@T0," where T0 is the timestamp when original configuration object 210 (FIG. 2A) was last saved.

Configuration object 210 is referred to a trunk of configuration objects 210 and 210A. Configuration objects 210 and 210A are a sequence 215 of configuration objects. The name of the sequence is "Default."

In more general terms, a sequence is a set of related configuration objects or setting objects that represent the editing history of an initial object. The sequence is identified by a sequence name. That is, the sequence is defined as all objects of the appropriate class with the same sequence name. Each object in a sequence is a revision of the sequence and represents a historical snapshot of the initial object. Each revision carries a timestamp that indicates when that particular revision was saved. In fact, the revision is identified by the timestamp value.

Figure 2E:
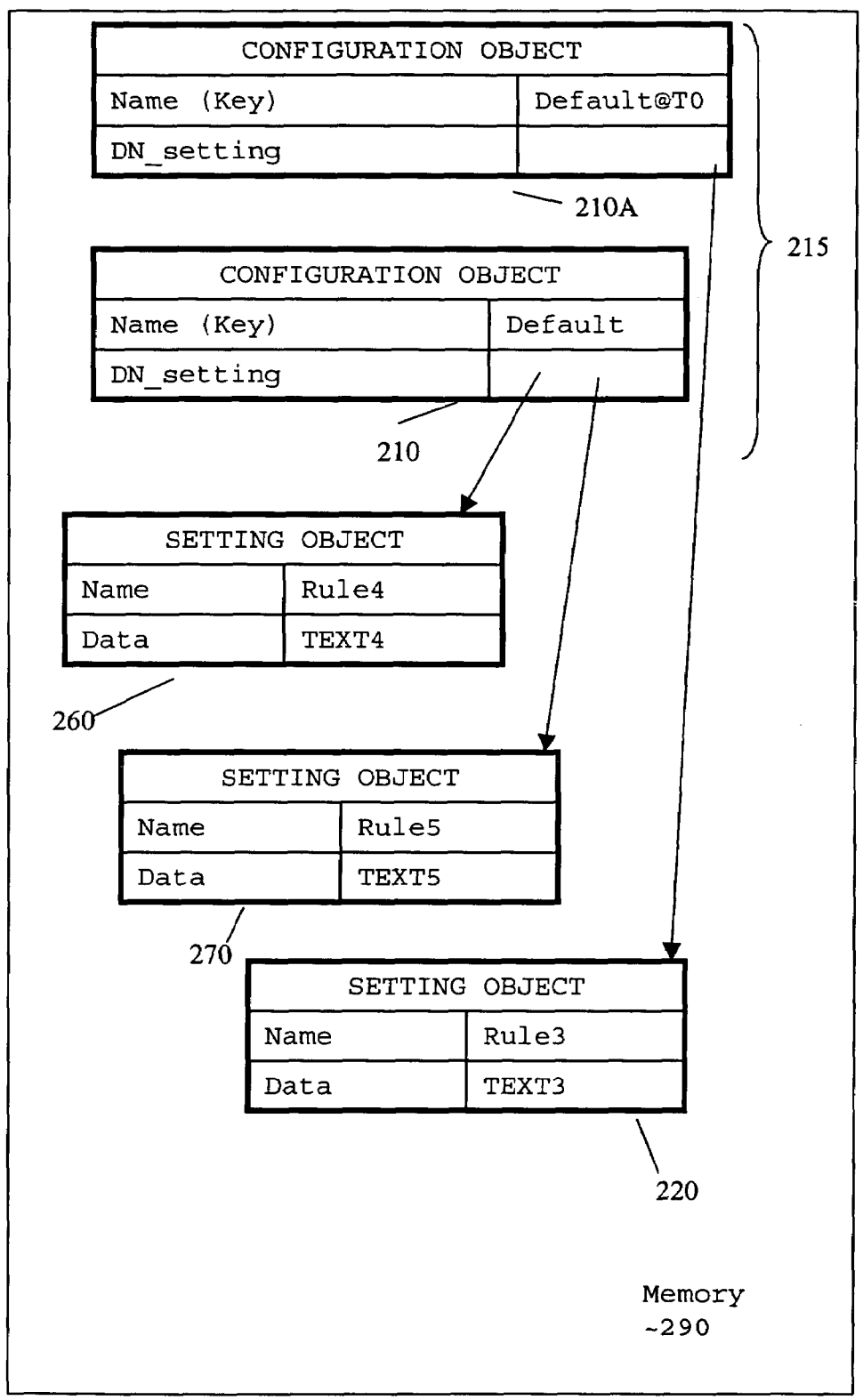
FIG. 2E illustrates setting objects being added to the trunk configuration object in the configuration object revision sequence of FIG. 2D according to one embodiment of the present invention.

The newest revision of a sequence is called the trunk and does not include a timestamp in the name. Another implementation could use a Boolean field within the objects to identify the trunk or some other mechanism As illustrated in FIG. 2E, in response to administrator directives, a pointer to setting object 260 and a pointer to setting object 270 are added to configuration object 210 and the pointer to setting object 220 is deleted.

Setting object 260 has a name "Rule4" that is stored in a setting object name field Name. Also, in this embodiment, parameter data "TEXT4" is stored in a setting object data field Data of setting object 260. Setting object 270 has a name "Rule5" that is stored in a setting object name field Name. Also, in this embodiment, parameter data "TEXT5" is stored in a setting object data field Data of setting object 270.

The new objects are saved at time T1. Thus, revised configuration object 210 (FIG. 2E) includes two settings 260 and 270, while original configuration object 210A still includes setting 220. After time T1, configuration object 210A cannot be changed and so is static. The timestamp of the current save operation is recorded in trunk revision configuration object 210A, but is not included in the key.

At a time after time T1, the administrator needs to change the parameter data for setting object 270 from "TEXT5" to TEXT5A". Accordingly, a new setting object 270A is generated, and the properties in setting object 270 are copied to setting object 270A except for the value of the key, which in this example is the value in name field Name.

Figure 2F:
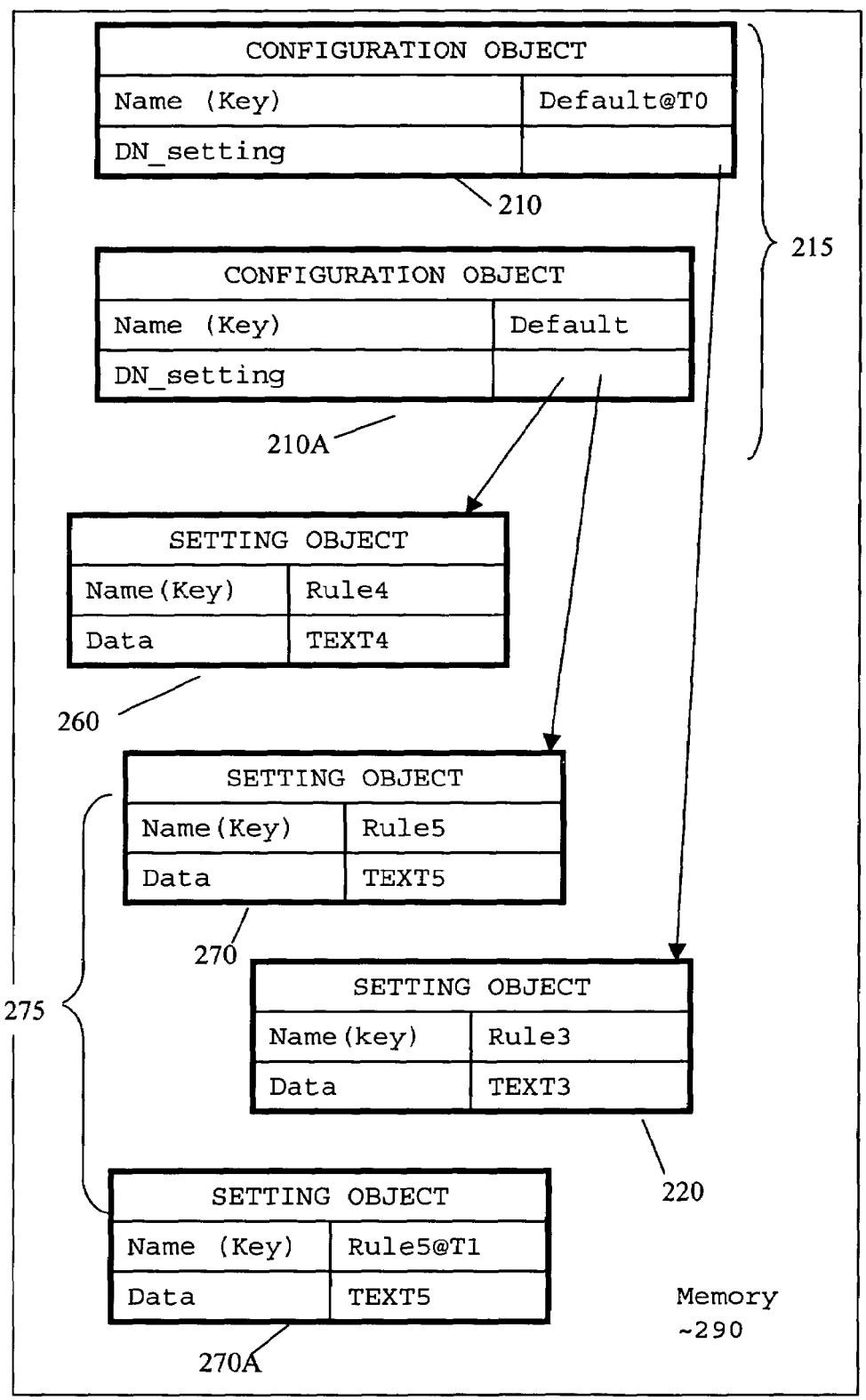
FIG. 2F illustrates a new setting object being created in a setting object revision sequence according to one embodiment of the present invention.

The value of the key property for setting object 270A is the value of the original key concatenated with a timestamp of the time original setting object 270 (FIG. 2F) was saved. Thus, in this example, the value of the key for setting object 270A is "Rule5@T1," where T1 is the timestamp.

Figure 2G:
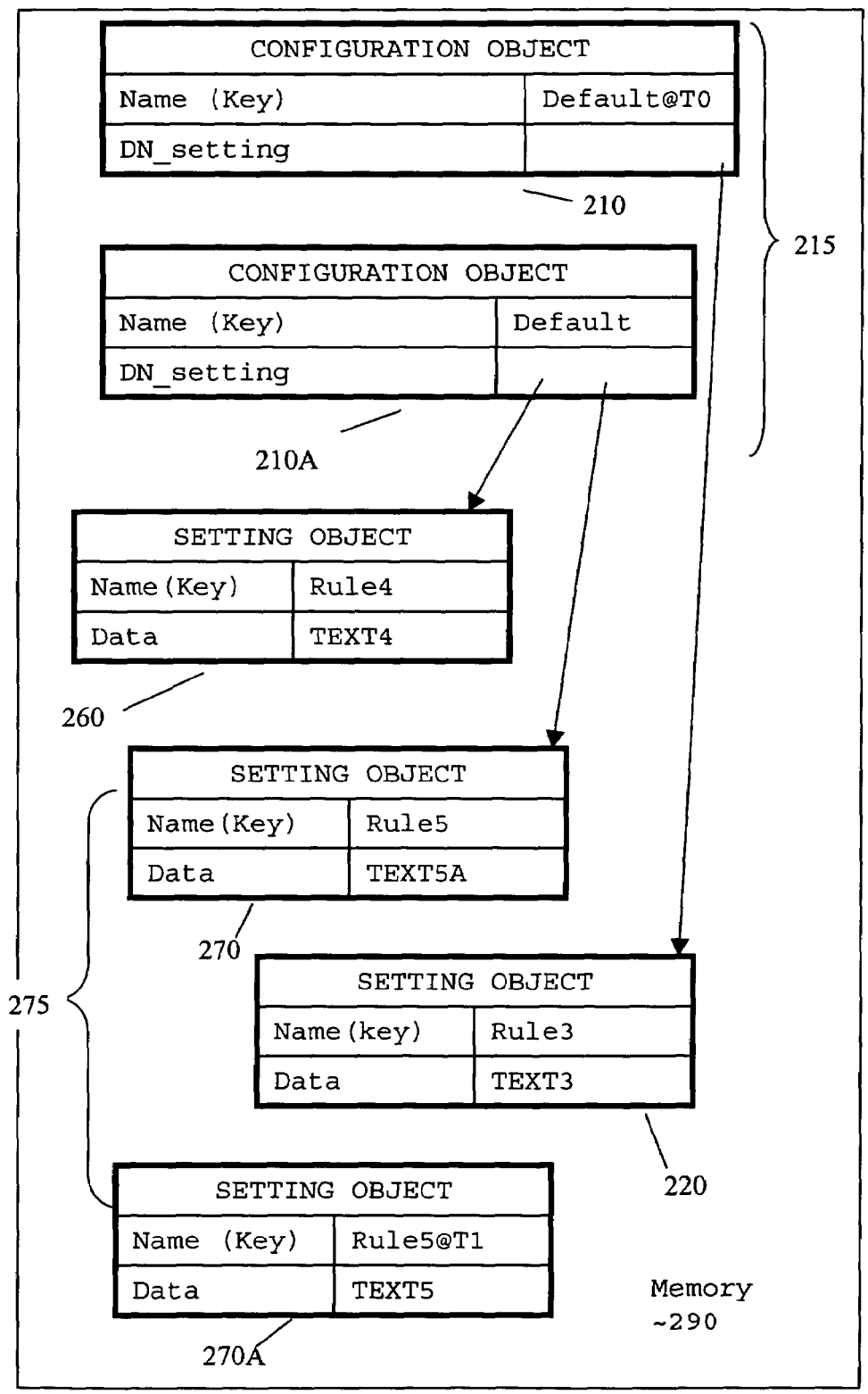
FIG. 2G illustrates editing of the trunk setting object in the setting object revision sequence of FIG. 2F according to one embodiment of the present invention.

The administrator next modifies the parameter data to "TEXT5A." (FIG. 2G). The trunk for setting objects 270 and 270A in setting object revision sequencer 275 is object 270. After setting object 270 (FIG. 2E) is saved, setting object 270A is static and cannot be modified.

Hence, in this embodiment, the storage location of the initial object, either setting or configuration, is maintained as the trunk of a sequence, and contains the most recent data. The older objects are stored in new locations in this embodiment. In this example, no pointers are used to track revisions of an object. In another embodiment, a revision sequence for an object could be implemented as a linked list, for example.

In FIGS. 2A to 2G, the memory structures in directory 116 are shown. The administrator is not required to physically perform the generate and copy operations described above. Rather, the administrator selects options in a GUI and enters data in a GUI, and the operations described with respect to FIGS. 2A to 2G are automatically performed.

Figure 3:
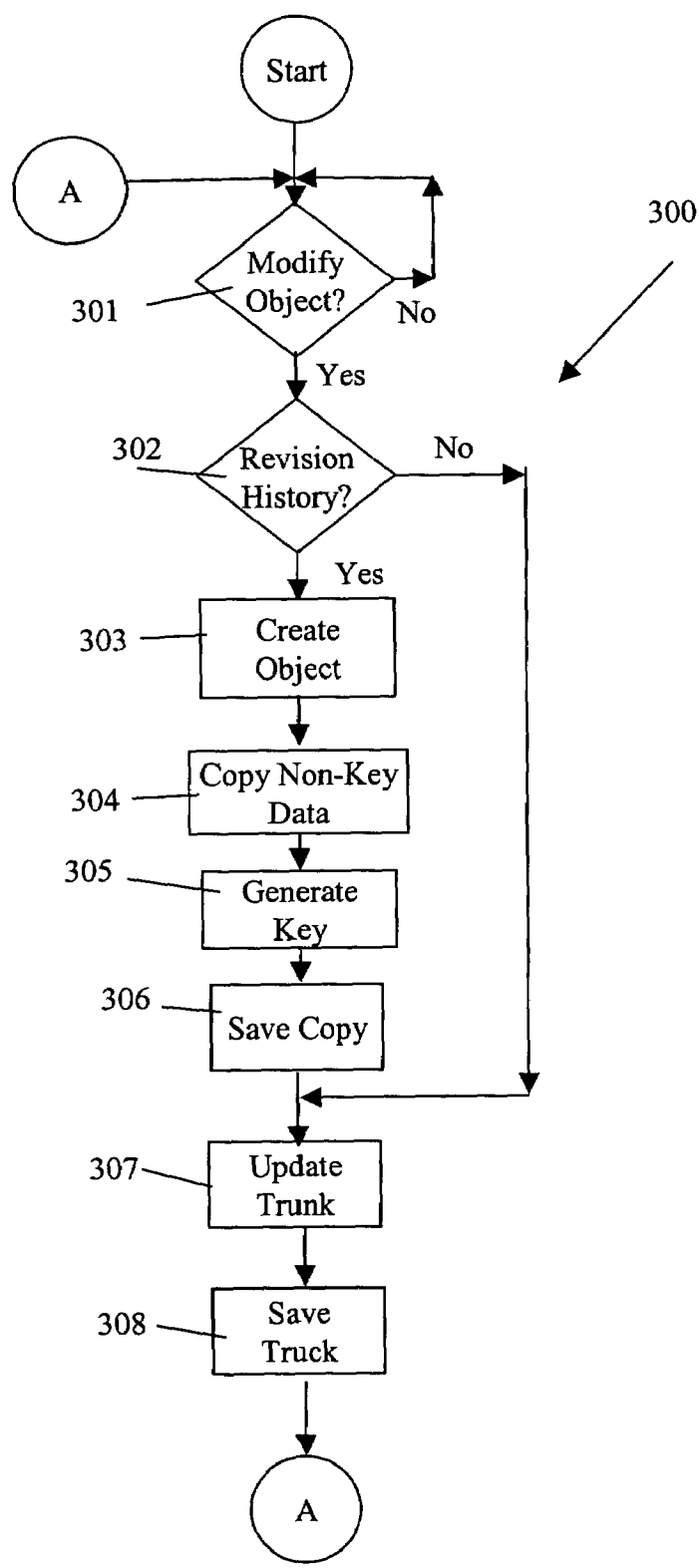
FIG. 3 is a process flow diagram for creating a revision sequence according to one embodiment of the present invention.

FIG. 3 is a process flow diagram of the Revisioning operations described above for FIGS. 2A and 2D to 2G. In object revision process 300, a modify object check operation determines whether a request has been made to modify a configuration object and/or setting object in directory 116, e.g., a first object. If such a request has been received, processing transfers from modify object check operation 301 to revision history check operation 302.

Revision history check operation 302 determines whether to maintain a version history for the objects. Managed products or other services that do not want the performance and storage overhead associated with revision tracking may turn off the Revisioning. If a version history is wanted, check operation 302 transfers to create object operation 304 and otherwise transfers to update trunk operation 307.

In create configuration object operation 303, a blank object structure is created in a memory. Upon completion of operation 303, processing transfers to copy non-key data operation 304.

Copy non-key data operation 304 copies all the data, except the data in a key field, from the first object, the original object, to the second object structure, the newly created object, in memory. Upon completion, operation 304 transfers processing to generate key operation 305.

Generate key operation 305 combines a timestamp for the first object with the value in the key field of the first object to generate a key for the second object. The key for the second object is stored in the key field of the second object. In one embodiment, the key is "value@timestamp," e.g., the key value is concatenated with the timestamp.

Operation 305 transfers to save copy operation 306 that in turn saves the second object. Save copy operations 306 transfers processing to update trunk operation 306.

In update trunk operation 307, the requested modifications are made to the first object, which is the trunk object. Update trunk operation 307 transfers to save trunk operation 308.

Save trunk operation 308 first writes the timestamp for the time of the save in the trunk object. Next save trunk operation 308 saves the trunk object. Operation 308, in this example, transfers to modify object check operation 301.

While process 300 has been described in a sequential order, process 300 is not limited to the specific sequence described, or to the sequential order. In addition, operation 301 should not be interpreted as requiring polling. Operation 301 indicates that the subsequent operations are not performed until a request to modify an object has been generated.

As described above a configuration object is a named collection of setting objects. An effective configuration is an entire set of data represented by a configuration object, its setting objects, its parent configurations (if any), and its parents' settings objects.

There is a difference between a revision history of a configuration object, as described above, and an effective configuration. The revision history of a configuration object is a record of the changes in its setting object membership and/or the configuration object itself. The effective configuration takes into account the inheritance history of each of the configuration objects contributing to the whole as well as any revisions, if consideration of the revisions is necessary. Due to the dynamic nature of the object relationships, this is not as simple as merely finding the current set of objects contributing to the whole and examining their individual histories. As explained more completely below, a parent-child inheritance merge process is used to determine the effective configuration.

Usually, a trunk revision of a configuration object is the configuration object assigned to a computer, user, or configuration group. Such an assignment is "dynamic." That is, the configuration represented by the trunk revision of the configuration object changes over time as the contributing configuration and settings objects are edited. If the XML value of a setting object is changed, the next time the managed product requests an effective configuration, the configuration includes those changes.

It is also possible to assign a non-trunk revision of a configuration object. Such an assignment is "static." That is, whenever a managed product requests the XML for its effective configuration, the managed product always receives the same XML string, describing the state of the whole configuration, as it existed at the time the non-trunk revision of the configuration object was created.

An actual configuration object is required to make a configuration assignment. The set of revision timestamps for an effective configuration may be (and usually is) much larger than the set of revision timestamps for the configuration object from which the effective configuration is obtained. A facility is provided for "retroactively" creating configuration objects for any desired timestamp.

In one embodiment, security management agent 120_m is based on the CIMOM (Common Information Model Object Manager) architecture that is implemented using the JAVA programming language. (JAVA is a trademark of Sun Microsystems, of Santa Clara, Calif., USA.) With the CIMOM architecture, security management agents are extensible by means of a well-documented interface for the creation of providers. Providers can be implemented to perform various operations.

The Common Information Model (CIM), published by the Distributed Management Task Force (DMTF), is an information model that covers all network objects and collections involved in managing distributed systems. In one embodiment, CIM is at version 2.2 and version 2.6 for the specification and schema, respectively, was used.

See for example, *Common Information Model Specification*, Ver. 2.2, Distributed Management Task Force, Inc., Portland, Oreg., Jun. 14, 1999, which is incorporated herein by reference to demonstrate the level of skill in the art. As is known to those of skill in the art, CIM is, first of all, a declarative modeling language, and secondly, a set of core and common schema for network management entities ranging from systems and devices to networks, users, policies, events and methods. In this embodiment, CIM is used as the foundation of the management model of security management system 150.

In addition to CIM, Web Based Enterprise Management (WBEM) and Directory Enabled Networks (DEN) are utilized. WBEM uses CIM as its information model, along with its schema, and defines CIM mappings on XML and the transport of these CIM mappings using XML over HTTP. This allows managed entities to inter-operate in heterogeneous environments. In this embodiment, WBEM is used in all security management services applications, and for management console 130, in particular.

Web-Based Enterprise Management (WBEM) is a set of management and Internet standard technologies that have been defined and developed to unify the management of enterprise computing environments. A core set of standards that make up WBEM. These standards include (1) the Common Information Model (CIM) standard already described above; (2) an encoding specification, the "xmlCIM Encoding Specification;" and (3) a transport mechanism, "CIM Operations over HTTP."

The CIM schema includes models for systems, applications, networks (LAN) and devices. The CIM schema enables applications from different developers on different platforms to describe management data in a standard format so that it can be shared among a variety of management applications.

The xmlCIM Encoding Specification defines XML elements, written in Document Type Definition (DTD), which can be used to represent CIM classes and instances. The CIM Operations over HTTP specification defines a mapping of XML-encoded CIM operations onto HTTP that allows implementations of CIM to interoperate in an open, standardized manner and completes the technologies that support WBEM.

Most operating systems, and their management tools, support CIM and WBEM. For example, Microsoft Corp. delivers a CIM object manager with its WINDOWS operating systems as part of its Windows Management Instrumentation (WMI) implementation of CIM. The CIM object manager supports a provider architecture where in-process COM servers (DLLs) that are mated to the CIM descriptions for a product or service are loaded into the WMI object manager. A managed product group would write the COM server that knows how to communicate with the managed product either directly, or with the managed product's native configuration format.

Similarly, Sun Microsystems provides a WBEM SDK and object manager for the Solaris operating systems. Tivoli is planning to ship its own object manager with future versions of TME. The Sun and Tivoli provider architectures are JAVA based, while Microsoft uses a COM provider architecture. Note that CIM 2.3 and higher includes a set of classes that map CIM objects to an LDAP directory as part of the DEN initiative. In this embodiment, each product specific operation control module includes CIM client capability.

In the embodiment of FIG. 1, for registration, policy and configuration data management for managed products, directory services are used. The Lightweight Directory Access Protocol (LDAP) specification is used to implement directory services. The DEN includes a set of mappings CIM objects into the object classes and hierarchical structures used by LDAP directories.

DEN also specifies a way to configure and maintain network nodes using standard directory services. Hence, in one embodiment of FIG. 1, security management system 150 uses the following widely-used standards-based models and implementations:

CIM for information modeling (including CIM mappings to LDAP);
LDAP for directory access and directory schema;
SQL Database for logging and alert event recording;
WBEM for remote method invocation, point-to-point configuration, and events;
HTTP and XML for multi-platform interoperability and WBEM compliance;
Internet standard protocols for discovery; and
a web-based administrative console.

Configuration Object

Figure 4:
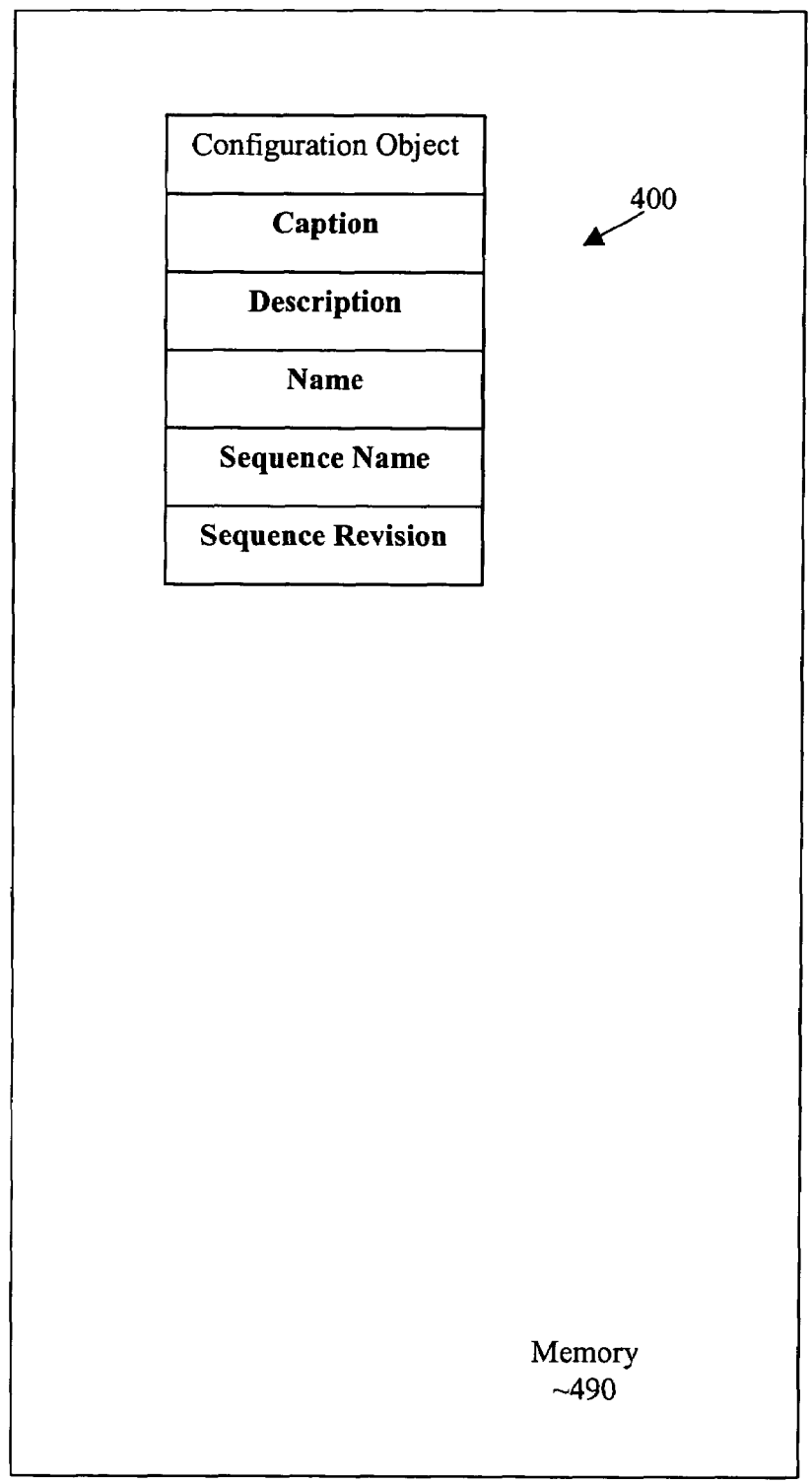
FIG. 4 is an illustration of one embodiment of a configuration object, e.g., a configuration object memory structure, for a managed product according to the principles of this invention.

For this embodiment, a configuration object 400 (FIG. 4) includes the properties presented in TABLE 1. Configuration object 400 is an instantiation of a configuration class SymcConfiguration. In this embodiment, class SymcConfiguration extends a directory object class that provides a delete method, a get distinguished names method, an is-same-directory-object method, a reload method, and a save method. A value of each property is stored in a configuration object field having the same name as the property name.

TABLE 1

| Property | Type | Defining Subclass |
| --- | --- | --- |
| Caption | String, MaxLen (64) | CimManagedElement |
| Description | String | CimManagedElement |
| Name | String, Key, MaxLen (256) | CimConfiguration |
| Sequence Name | String, Required | SymcConfiguration |
| Sequence Revision | datetime, Required | SymcConfiguration |

A value stored in a caption field Caption (FIG. 4) is a short textual description (one-line string) of configuration object 400. The information stored in a description field Description is a textual description of configuration object 400. Information in field Caption and information in field Description are available to administrators.

A value in name field Name is a label by which configuration object 400 is known. In one embodiment, the value in field Name is automatically generated using the information in field SequenceName and field SequenceRevision, which are described more completely below. The value in field Name is a database key for configuration object 400.

A value in sequence name field SequenceName is a string that uniquely identifies the revision sequence of configuration objects. A value in sequence revision field SequenceRevision is a date-time value indicating when configuration object 400 was last saved. In one embodiment, the value in field SequenceRevision has a format in the form of YYYYMMDDHHmmSS.uuuZ where YYYY is the year, MM is the month, DD is the date, HH is the hour, mm is the minute, SS is the seconds, and uuu is the number of milliseconds.

In addition to the properties shown in Table 1, a configuration object in directory 116 has a multi-valued attribute containing distinguished names (DN) pointers to setting objects that belong to the configuration object. The configuration object also has a single-valued attribute containing a DN pointer to its parent configuration object (if any) for inheritance purposes. These attributes are automatically updated by association management methods.

In one embodiment, once created, a configuration object is not modified. Instead, a new configuration object is created based on the old configuration object, for example using process 300. This provides a historical record of configuration modifications.

In one embodiment, a configuration object also has a valid field and a metadata field. The valid field has a value of true or false that indicates the validity state of the configuration object. A string in the metadata field is available for use by application console plug-ins.

Configuration object 400 includes, in this embodiment, methods for getting the value of each property. Methods for setting the value in fields Caption, Description, Valid, and MetaData are provided also. A find configured method finds the collection of computers, users, configuration groups, and organizational units using configuration object 400. A find software features method finds the software feature associated with configuration object 400.

Methods for setting objects associated with configuration object 400 include an add setting method, a remove setting method, a load setting method, and a find settings method. The name of each method is indicative of the operations performed by the method.

Similarly, for a parent configuration object, there are a load parent configuration method, a set parent configuration method, and a remove parent configuration method. Again, the name of each method is indicative of the operations performed by the method.

Methods also are provided for generating a standardized XML representation of configuration object 400 and its setting objects. As explained above, one configuration object may "inherit" information from another configuration object by making the latter a parent of the original. The methods for retrieving the XML value for configuration object 400 optionally follow the parental inheritance chain and merge the XML representations of each configuration into one XML string whose format resembles that of a parentless configuration's XML value as described more completely below.

Hence, in this embodiment, there are two embodiments of a get configuration XML method. Both embodiments are invoked on a trunk configuration object. The first method is simpler, and interprets the distinguished name pointers in the configuration object literally as pointers to other trunk objects. The second method accepts an additional timestamp parameter. This method considers each distinguished name pointer and adjusts the pointer before using it to fetch an associated object. The second method replaces the pointer to a trunk object with a pointer to the newest historical revision object that is not newer than the input timestamp. So, the second method gets the whole configuration XML "as of" the timestamp, or in other words, the second method gets the same XML that would have been gotten from the trunk configuration at that timestamp.

In one embodiment, the first method also works as expected on a non-trunk configuration. In this embodiment, the first method calls the second method using the revision timestamp of the configuration.)

Also, there are two embodiments of a save method. If a method save is called, the current configuration object overwrites the corresponding configuration object stored in memory. However, is a save new revision method saveNewRevision is called, a new revision of the stored configuration object is saved. Consequently, when method saveNewRevision is used, a configuration object revision history is generated. Hence, when a configuration object is saved, the previous state of the configuration object is preserved as a past revision of the configuration object.

In the embodiment of TABLE 1, a configuration "revision sequence" is the set of configuration objects that share the same sequence name stored in field SequenceName, and are distinguished by their sequence revision timestamps. For the trunk revision object, the timestamp is that of the last save operation or the last save new revision operation. For non-trunk revision configuration objects, the timestamp is the time at which that configuration object state was saved as the trunk (as opposed to the time at which the revision configuration object was created off the trunk). Once created, a non-trunk revision object cannot be modified.

There is a distinction between the meaning of a sequence revision timestamp for a configuration object, and a revision timestamp for the XML value of a configuration object, i.e., the effective configuration. One method for obtaining this XML value is described more completely below. The sequence revision timestamp of a configuration object is the value in field SequenceRevision. A revision timestamp for the XML value of a configuration object is the last timestamp in fields SequenceRevision from all of the contributing objects, i.e., configuration and setting objects. In other words, the most recent sequence revision value from all the contributing objects.

Setting Object

Figure 5:
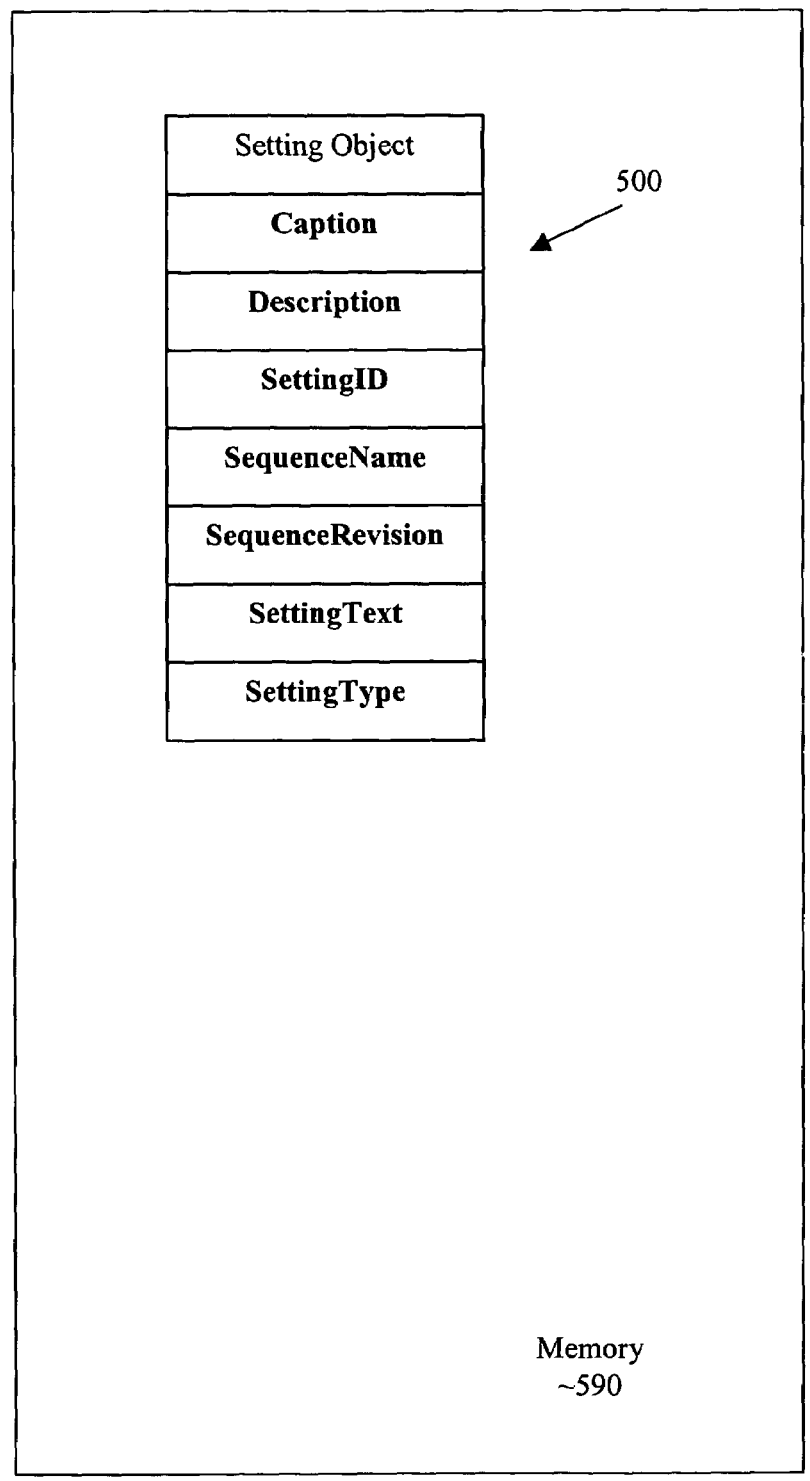
FIG. 5 is an illustration of one embodiment of a setting object, e.g., a setting object memory structure, for a managed product according to the principles of this invention.

For this embodiment, a setting object 500 includes the properties presented in TABLE 2. Setting object 500 is an instantiation of a setting class SymcSetting. In this embodiment, class SymcSetting extends the directory object class that provides a delete method, a get distinguished names method, an is-same-directory-object method, a reload method, and a save method. A value of each property is stored in a setting object field having the same name as the property name. (See FIG. 5, where the property is used as a reference numeral.)

TABLE 2

| Property | Type | Defining Subclass |
|---|---|---|
| Caption | String, MaxLen (64) | CimManagedElement |
| Description | String | CimManagedElement |
| SettingID | String, Key, MaxLen (256) | CimSetting, SymcSetting |
| SequenceName | String, Required | SymcSetting |
| SequenceRevision | datetime, Required | SymcSetting |
| SettingText | String | SymcSetting |
| SettingType | String | SymcSetting |

A value stored in a caption field Caption (FIG. 5) is a short textual description (one-line string) of setting object 500. The information stored in a description field Description is a textual description of setting object 500. Information in field Caption and information in field Description is available to administrators.

A value in setting identifier field SettingID is a label by which setting object 500 is known. In one embodiment, the value in field SettingID is automatically generated using the information in sequence name field SequenceName and sequence revision field SequenceRevision, which are described more completely below. The value in field SettingID is a database key for setting object 500.

A value in sequence name field SequenceName is a string that uniquely identifies the revision sequence of setting objects. A value in sequence revision field SequenceRevision is a date-time value indicating when setting object 500 was last saved. In one embodiment, the value in field SequenceRevision has a format in the form of YYYYMMDDHHmmSS.uuuZ where YYYY is the year, MM is the month, DD is the date, HH is the hour, mm is the minute, SS is the seconds, and uuu is the number of milliseconds.

Data in setting text field SettingText provides application-specific preference settings. In this embodiment, this data has an XML format.

Information in setting type field SettingType defines the semantic characteristics of the setting object. In one embodiment, this is the MIME type of the data in field SettingText, e.g., "text/xml."

In one embodiment, a setting object also has a valid field and a metadata field. The valid field has a value of true or false that indicates the validity state of the setting object. In one embodiment, the valid field is set to true when the setting object is created and otherwise is unused. A string in the metadata field is available for use by application console plug-ins. For example, a plug-in may use different metadata values to distinguish between multiple kinds of setting objects. A particular plug-in might allow administrators to create "UI" setting objects and "Scan" setting objects, and then create configuration objects requiring one instance of a "UI" setting object and zero or more instances of a "Scan" setting object.

Setting object 500 includes, in this embodiment, methods for getting the value of each property in Table 2. Methods for setting the value in fields Caption, Description, SettingText, SettingType, Valid, and MetaData are provided also. A find software features method finds the software feature associated with setting object 500.

Setting object 500 also includes a method save and a method saveNewRevision. These methods operate on the setting object in a manner equivalent to that described above for the corresponding configuration object save methods.

In addition to the methods for configuration and setting objects, a software feature interface includes methods associated with configuration and setting objects. The software feature interface contains methods to load a one of the software feature's configuration or setting objects. There are two flavors of each load method; one accepts the sequence name only and always returns the trunk object, and the other accepts the sequence name and a revision timestamp and returns that revision object. This interface also contains methods to find all of the software feature's configuration objects or setting objects. A find method has a Boolean flag to determine if only trunk objects are to be found, or all objects are to be found. These methods are used in one embodiment by a management console plugin module for editing the objects.

The find configuration revisions method in the software feature interface generates a complete set of change timestamps for a whole configuration, identified by a sequence name. A load closest configuration method finds the correct configuration object to use for any of those timestamps (or for any timestamp provided). A create missing configuration method retroactively creates a configuration revision object for any timestamp. These methods with the second embodiment of the get configuration XML method that was described above are used in one embodiment by a management console process that analyzes and presents a configuration timeline, in preparation for rollback, for example.

As described above, configuration objects and setting objects used distinguished names (DNs) as pointers. Recall that for any CIM class, all objects of that class must be uniquely identified by the concatenation of their key property values. In the directory representation of the object, the object's DN includes the names and values of those key properties. The implementation of the configuration revision system was constrained, in this embodiment, by the fact that CIM predefines a key property for class CimConfiguration. This prevents derived class SymcConfiguration from defining additional key properties.

In a directory, once a configuration object or setting object is created, it is inconvenient to later change the distinguished name of that object. This is because other objects may contain string representations of this distinguished name, used as a pointer, and these strings would have to be located and updated. For a configuration object in particular, it is very useful for its distinguished name pointers to be maintenance free. Usually these distinguished name pointers need to be interpreted as trunk pointers, but it is also useful to reinterpret the meaning of the pointers at run time with the aid of a timestamp value.

As explained above, when a new sequence is created, the sequence has just one revision that is the trunk. The single key property of this object (property Name for a configuration object (See TABLE 1) and property SettingID for a setting object (See TABLE 2) contains the sequence name only. This object remains the trunk object forever and its distinguished name never changes. Another object pointing to this first revision always points to the trunk, even as it is edited over time. The trunk revision happens to have a key property whose value is the same as its sequence name property value.

Figure 6B:
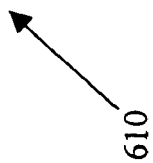
FIG. 6B is a more detailed example of one embodiment of a setting object for the managed product according to the principles of this invention.

Consider an example of an application named "Demo" with a product ID of 3000 that installs a software feature named "Scanner" into directory 116 on Jul. 1, 2003 at noon. A single configuration object 600 (FIG. 6A) named "Default" is created. Property Name has the value "Default." Property SequenceName also has the value "Default." The value of property SequenceRevision is a timestamp string in the format yyyyMMddhhmmss.SSS'Z', e.g., "20030701120000.000Z". The distinguished name for configuration object 600 is presented in TABLE 3.

TABLE 3

OrderedCimKeys="CIM_Configuration.Name=Default",
cn=Configs,
orderedCimKeys="Symc_SoftwareFeature.Name=Scanner",
orderedCimKeys="CIM_Product.IdentifyingNumber=3000
   Name=Demo SKUNumber=S12345 Vendor=Symantec
   Version=1.0",
cn=Products,
ou=Applications,
o=symc_ses Configuration object 600 is the trunk, sometimes called the trunk revision. As indicated above, if a sequence of configuration objects named "Default" is generated, configuration object 600 remains the trunk, and the distinguished name pointer of TABLE 3 to the trunk remains unchanged.

A single setting object 610 (FIG. 6B) named "Main" is also created in directory 116 by the installation. Thus, property SettingID has the value "Main". Property SequenceName has the value "Main" also. Property SequenceRevision has a timestamp value, "20010701120000.000Z". The distinguished name for setting object 610 is presented in TABLE 4.

TABLE 4 orderedCimKeys="Symc_Setting.SettingID=Main",
cn=Settings,
orderedCimKeys="Symc_SoftwareFeature.Name=Scanner",
orderedCimKeys="CIM_Product.IdentifyingNumber=3000
  Name=Demo SKUNumber=S12345 Vendor=Symantec
  Version=1.0",
cn=Products,
ou=Applications,
o=symc_ses Setting object 610 is the trunk. As indicated above, if a sequence of setting objects named "Main" is generated, setting object 610 remains the trunk, and the distinguished name pointer of TABLE 4 to the trunk remains unchanged. The distinguished name pointer of TABLE 4 is added to configuration object 600 (FIG. 6A) so that configuration object 600 points to setting object 610. In one embodiment, it is said that the distinguished name pointer is stored in a setting object pointer field of configuration object 600.

As used herein field is a general term associated with a storage location and is not intended to denote features or characteristics of the data stored. As is known to those of skill in the art, in the Common Object Model (CIM), classes have "properties" and an instance of a class is an "object". When an instance of a CIM class is stored in an LDAP directory (using the CIM DEN LDAP mapping instructions, or anything else for that matter), the object is stored as an LDAP "entry". LDAP entries have "attributes". Both properties and attributes are named lists of values, so each CIM property is mapped to an LDAP attribute. JAVA objects representing a CIM object loaded from an LDAP directory have private data members with get/set accessor methods for each CIM property.

Figure 6D:
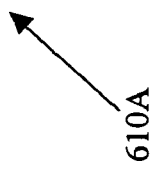
FIG. 6D illustrates the copying of parameters from the original setting object to the new setting object for the managed product according to one embodiment of this invention.

At 12:05 on Jul. 1, 2003, an administrator edits Main setting object 610 using console 130 to change the value of property SettingText. As described above, when a trunk revision is edited, a new object is created, e.g., object 610A (FIG. 6C) to serve as a snapshot of trunk 610. All property values are copied from pre-edited trunk 610, except for the key property to setting object 610A (FIG. 6D).

The value of key property SettingID is set to the sequence name, e.g., "Main", concatenated with the timestamp of trunk 610 (more precisely, SequenceName+"@"+SequenceRevision). Note that this is the timestamp of trunk 610 (FIG. 6B) prior to trunk 610 being edited. Once a non-trunk object is created, the non-trunk-object may not be modified. The distinguished name pointer for non-trunk setting object 610A (FIG. 6E) is presented in TABLE 5.

TABLE 5 orderedCimKeys=
  "Symc_Setting.SettingID=Main@20030701120000.000Z",
cn=Settings,
orderedCimKeys="Symc_SoftwareFeature.Name=Scanner",
orderedCimKeys="CIM_Product.IdentifyingNumber=3000
  Name=Demo SKUNumber=S12345 Vendor=Symantec
  Version=1.0", TABLE 5-continued cn=Products,
ou=Applications,
o=symc_ses Next, trunk object 610REV is updated with the newly edited value (FIG. 6F). In this example, a logging capability is set to false. When trunk object 610REV is saved, the timestamp is updated to the current time. Subsequent edits of the trunk are handled the same way.

Hence, original Main setting object 610 (FIG. 6B) has property SequenceRevision changed to 20030701120500.000Z and property SettingText updated. However, the distinguished name pointer of TABLE 4 does not change. The values of the properties of configuration object 600 do not change.

Hence, in this example, software feature "Scanner" has two settings, a scan enabled setting, and a log enabled setting, but only one is used at a time. Both settings have Boolean values.

In another embodiment, different from the above example, both settings are included in the default setting object. This setting object 710 is presented in FIG. 7. The same default configuration object 600 (FIG. 6A) is created in this embodiment.

Figure 8:
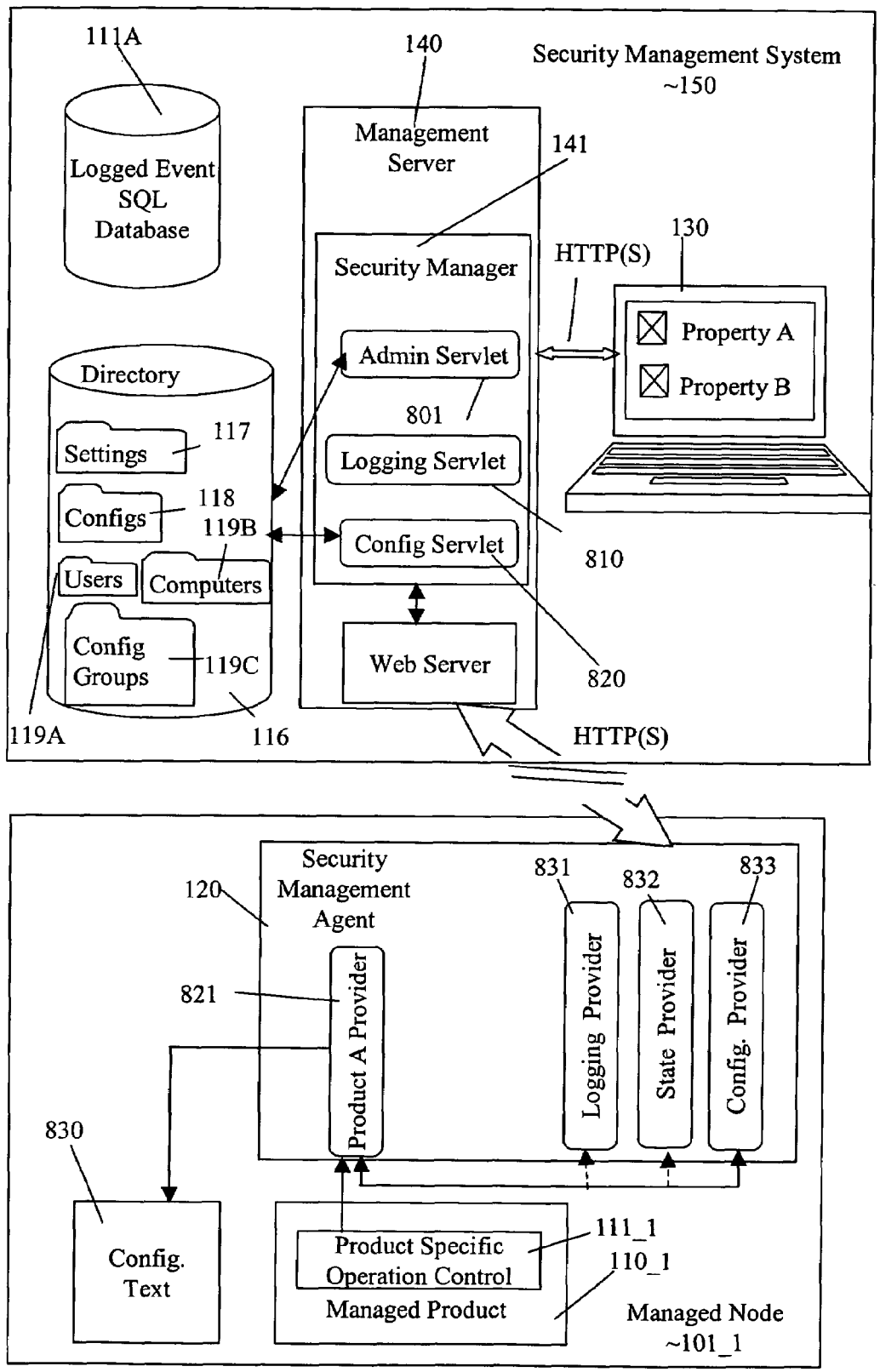
FIG. 8 is a more detailed diagram of a portion of the system of FIG. 1 according to one embodiment of the present invention.

FIG. 8 is a more detailed diagram of a portion system 100 of FIG. 1. Product A provider 821 communicates with logging provider 831, state provider 832, and configuration provider 833. State provider 832 sends the operational state of managed product 110_1 and managed node 101_1 to security manager 141. Configuration provider 833 retrieves configurations for managed product 110_1 from security manager 141 using configuration servlet 820. Logging provider 831 sends security events from security management agent 120 to logging servlet 810, in security manager 141, which functions as log database server 110A.

Security management agent 120 also includes an inventory provider, a service notification provider, and an update provider that are not shown. The inventory provider sends information about managed product 110_1 that is installed on managed node 101_1 from security management agent 120 to security manager 141. The service notification provider notifies security manager 141 when a new configuration is available. This is a "ping" which indicates that a new configuration should be retrieved via configuration provider 833 making a call to the configuration service, e.g., configuration servlet 820 at management server 140.

For managed product A, properties that are going to be available for configuration, i.e., product integration data, are entered in a product integration XML (PIX) file. Hence, in general, a managed product uses a PIX file to register with security manager 141. The product integration data includes a product name, a product ID, and a software feature ID as well as settings and properties associated with the managed product.

There are two types of install. There is a server side install, adding registration entries to directory 116, schema extensions to database 111A, and possible, UI extensions to console 130. There are also agent side installs that register the actual endpoint product with agent 120, as well as the product A install itself (which is usually independent of security management system 150, except for the agent extensions and registration).

Copending, commonly filed, and commonly assigned U.S. patent application Ser. No. 10/660,225, entitled "A SECURITY MANAGEMENT SYSTEM INCLUDING FEEDBACK AND CONTROL" of Paul M. Agbabian provides a description of the elements of both FIG. 1 and FIG. 8 as well as event structures, files, etc. that are utilized by system 100. The Summary, Brief Description of the Drawings, Detailed Description, claims and Abstract and Drawings of U.S. patent application Ser. No. 10/660,225, entitled "A SECURITY MANAGEMENT SYSTEM INCLUDING FEEDBACK AND CONTROL" of Paul M. Agbabian are incorporated herein by reference in their entireties.

Figure 7:
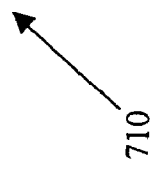
FIG. 7 is another example of a setting object according to one embodiment of this invention.

Security management system 150 uses configuration provider 833 to facilitate centralized configuration distribution of application properties, i.e., configuration, to managed products. In this example, the configuration for managed product 101_1 is defined by configuration object 600 (FIG. 6A) and setting object 710 (FIG. 7). Configuration servlet 820 retrieves configuration object 600 and uses the DN pointer to retrieve setting object 710. Configuration servlet 820 constructs an effective configuration string from default configuration object 600 that is presented in TABLE 6.

TABLE 6

<Configuration ProductID="3000" ProductVersion="1.0"
   SoftwareFeatureName="30009999" Name="Default"
   Revision="20030701120000.000Z">
<ScanEnabled>true</ScanEnabled>
<LogEnabled>false</LogEnabled>
</Configuration>

The XML string of TABLE 6 begins with an element tag <Configuration> with the following attributes product identifier, product version, and software feature name, in this example. The values for these attributes are obtained from arguments to method getConfigurationXMLInfo( ): ProductID, ProductVersion, SoftwareFeatureName. In addition, tag <Configuration> has attributes configuration name, and revision. The value of the revision attribute is the most recent revision timestamp of any of the configuration or setting objects used to generate the XML string.

The content of the configuration element includes the text values of each of the configuration's associated setting objects, concatenated together. If a setting object's property DataType is a MIME type beginning with "text/", the text value of the setting object is the value of its data property with appropriate encoding conversions. Otherwise, the text value is undefined.

If configuration inheritance was obeyed during generation of the configuration element, the final XML string is the pair wise merging of the non-inherited XML for each configuration object in the inheritance chain, starting with the most-derived configuration as described more completely below.

Thus, in this example, configuration servlet 820 adds tag <Configuration> as a wrapper around the setting data string to form the configuration element. Tag <Configuration> attributes identify the configuration object used. The setting object is not identified. The existence of setting objects is completely invisible to managed product 110_1 that receives the effective configuration string of TABLE 6.

After generating the effective configuration string of TABLE 6, configuration servlet 820 provides the string to configuration provider 833 that in turn provides the string to provider 821. Provider 821 directs module 111_1 to update its configuration with the string. After managed product 110_1 completes the configuration update, an appropriate event is generated reflecting the status of the configuration update. The event is sent to product A provider 821 that in turn provides the event to logging provider 841.

Logging provider 841 adds appropriate information as required to the event and forwards the event to logging servlet 810. Logging servlet 810 stores the event in database 111A. Security manager 841 can also forward the event to security and feedback control system 155 or to any other event sink registered to receive the event.

Thus, in more general terms, a managed product obtains an effective configuration from configuration servlet 820. An administrator may create many configuration objects for a managed product, but a managed product can only use one configuration object at a time. The configuration object that is used is determined by the assignment of configuration objects to users, computers, and configuration groups of users and computers, all of which are objects stored in directory 116.

Configuration servlet 820 selects a configuration object based on the identity of the user and computer provided by the managed product. Configuration servlet 820 generates a configuration element that is a representation of the configuration object by encapsulating all of the configuration object's setting XML strings into one string. In addition, if the configuration object has an inheritance chain (one or more parents), configuration servlet "resolves" the chain into a single configuration element by applying a parent-child inheritance merge process to each child/parent configuration object pair. The result is the "effective configuration".

Extending the previous example, assume managed product 110_1 has a machine-specific parameter called ForwardingServer (a host name). An administrator decides to derive a new configuration object 900 from configuration object 600.

Specifically, a new configuration object named "Custom" is derived from configuration object 600 named "Default." The configuration object addresses a setting named "Server1" that has a forward to server setting that the administrator wants to set to "server2".

The administrator first creates a new setting object 910 (FIG. 9A) that has property SettingID and property SequenceID set to "Server1". Property SettingText is set to "<ForwardingServer>server2</ForwardingServer>." Setting object 910 is saved at 1205 p.m. on Jul. 3, 2003. The distinguished name for the new setting is presented in TABLE 7.

TABLE 7 orderedCimKeys="Symc_Setting.SettingID=Server1",
cn=Settings,
orderedCimKeys="Symc_SoftwareFeature.Name=Scanner",
orderedCimKeys="CIM_Product.IdentifyingNumber=3000
   Name=Demo SKUNumber=S12345 Vendor=Symantec
   Version=1.0",
cn=Products,
ou=Applications,
o=symc_ses As explained above, a configuration object revision sequence has just one configuration object revision that is the trunk revision. The single key property Name of this configuration object contains the sequence name only. This configuration object remains the trunk object forever and the distinguished name of the trunk object never changes. The trunk revision happens to have a key property whose value is the same as the value of its property SequenceName. This redundancy is necessary. Thus, configuration object 600 remains the trunk object for the parent configuration object.

A new configuration object 900 (FIG. 9B) is created to serve as a child of parent object 600 (FIG. 6A). Since configuration object 900 is a new configuration object, the value of key property Name and property SequenceName are both given a new unique value "Custom." Since configuration object 900 inherits from configuration object 600, the distinguished name of configuration object 600 is placed in field DN_parent of configuration object 900.

The distinguished name of configuration object 900 (FIG. 9D) is presented in TABLE 8.

TABLE 8

Figure 9A:
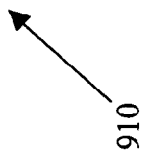
FIG. 9A is yet another example of a setting object according to one embodiment of this invention.
Figure 10:
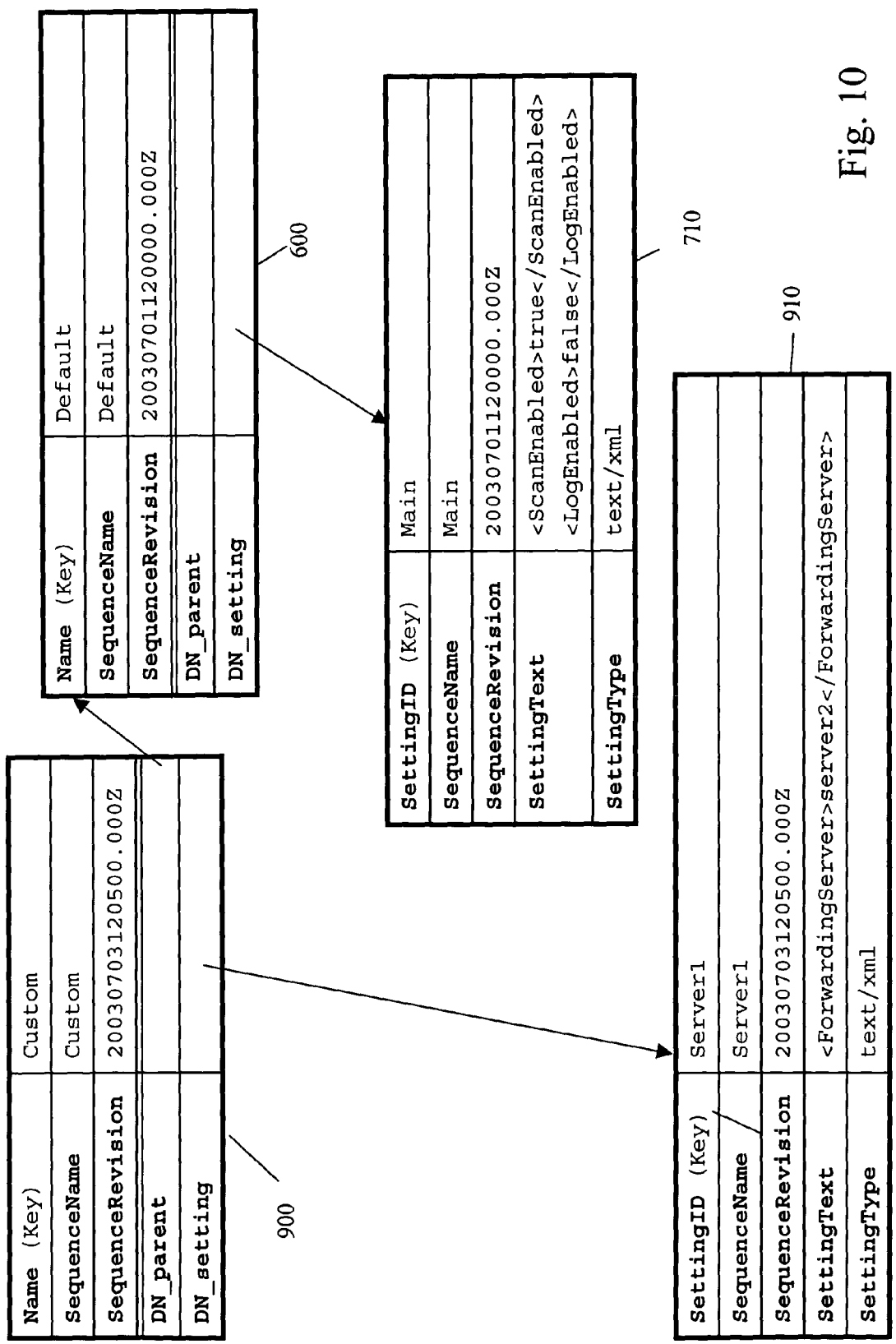
FIG. 10 is an illustration of the configuration inheritance chain created through the sequence of operations illustrated in FIGS. 9B and 9C, according to one embodiment of this invention.
Figure 11:
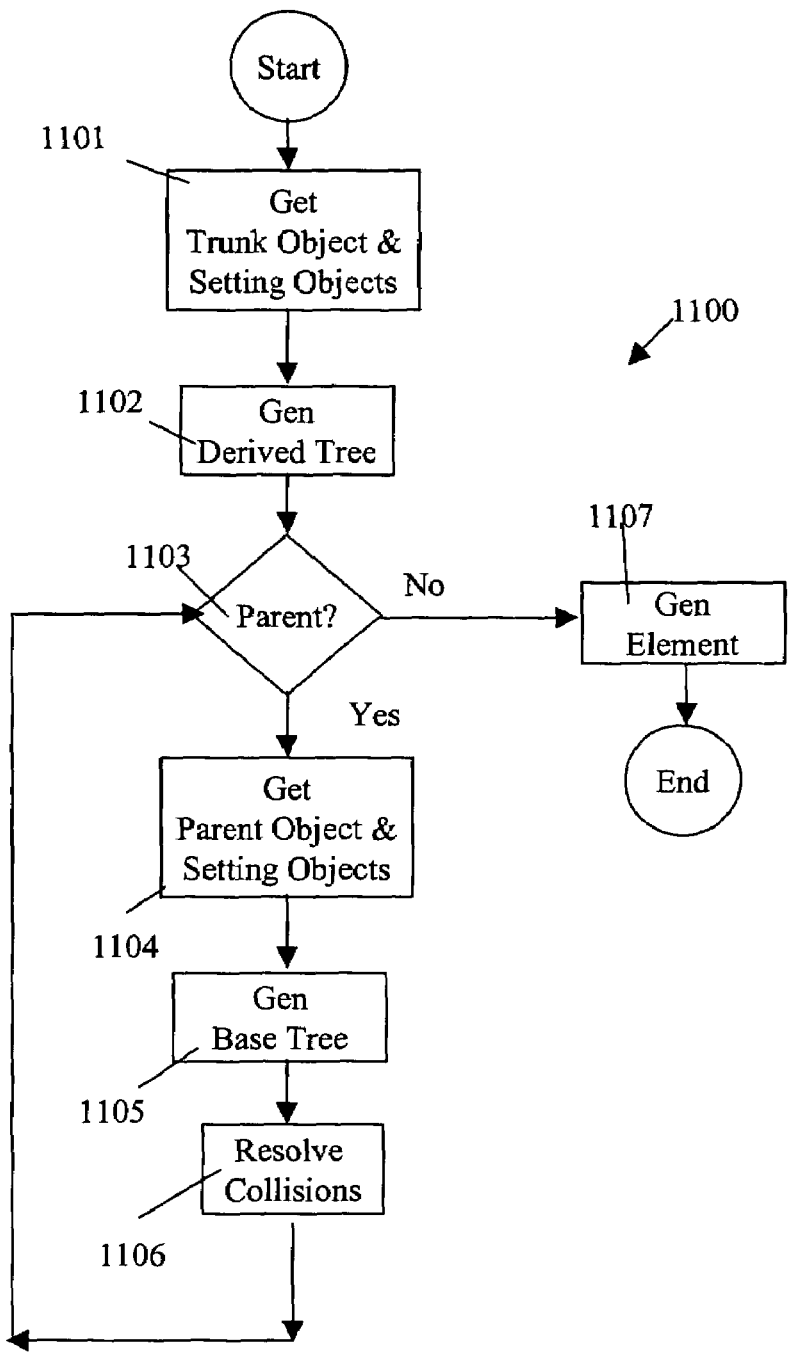
FIG. 11 is a process flow diagram for one embodiment of a parent-child inheritance merge process according to the principles of this invention.

OrderedCimKeys="CIM_Configuration.Name=Custom",
cn=Configs,
orderedCimKeys="Symc_SoftwareFeature.Name=Scanner",
orderedCimKeys="CIM_Product.IdentifyingNumber=3000
    Name=Demo SKUNumber=S12345 Vendor=Symantec
    Version=1.0",
cn=Products,
ou=Applications,
o=symc_ses Next, the distinguished name pointer to setting object 910 (FIG. 9A) is added to configuration object 900 (FIG. 9C). The timestamp of when configuration object 900 is saved in field SequenceRevision FIG. 10 is an illustration of the configuration for software feature "Scanner" as presented in FIGS. 9A, 9C, 6A and 7. As indicated above when configuration servlet 820 generates an effective configuration for the configuration of FIG. 10 for software feature "Scanner," a parent-child inheritance merge process 1100 (FIG. 11) is used to process the inheritance chain.

An inheritance chain is resolved from the bottom up. Starting with the most-derived configuration object, each configuration object is merged with its parent configuration object, and if necessary, the configuration object formed from the parent/child merger is merged with its parent configuration object and so on.

In each merge of a parent/child pair, collisions between element nodes are resolved based upon either a default resolution mode, or a collision resolution mode specified as an attribute for the element node, as described more completely below. Herein, an element node represents an XML start-tag. A collision occurs when an element node in the base tree (parent) has the same depth and collision detection name as an element node in the derived tree (child).

Without more, the collision detection name is the tag name of the XML start-tag. However, as explained more completely below, a novel collision name generation process allows using a name attribute with a namespecifier that generates a string that is appended to the start tag name to form a collision detection name.

In this embodiment, parent-child inheritance merge process 1100 operates on an XML string constructed for each configuration object and its setting objects in the parent/child pair. Hence, in get trunk object and setting objects 1101, the most derived configuration object is retrieved from directory 116 for the inheritance chain. An XML string is generated that is the concatenation of XML strings in the setting objects wrapped by a configuration tag <Configuration>. Process 1100 does not operate on individual setting object XML strings and is essentially unaware of setting objects.

Thus, for the example of FIG. 10, the most derived configuration object is object 900 (FIG. 9C) with setting object 910 (FIG. 9A). Hence, for this example, operation 1101 generates the XML string presented in TABLE 9.

TABLE 9

<!- - derived - - >
<configuration>
    <setting>
        <ForwardingServer>server2</ForwardingServer>
    </setting>
</configuration>

The configuration element in TABLE 9 is passed to generate derived tree operation 1102 that converts this XML string to a document object model (DOM) tree. Operation 1102 transfers to parent check operation 1103.

Parent check operation 1103 determines whether there is a parent configuration object for the derived configuration object, e.g., does the parent configuration pointer field DN_parent of the derived object include a valid pointer. In the example of FIG. 10, configuration object 900 has a valid point to parent configuration object 600 in parent configuration pointer field DN_parent. Thus, parent check operation 1103 transfers to get parent object and setting objects operation 1104.

In get parent object and setting objects 1104, the parent configuration object and its setting object are retrieved from directory 116. An XML string is generated for the parent object, sometimes called base object, which is the concatenation of XML strings in the setting objects wrapped by a configuration tag <Configuration>.

For the example of FIG. 10, the parent configuration object is object 600 (FIG. 6A) with setting object 710 (FIG. 7). Hence, for this example, operation 1104 generates the XML string presented in TABLE 10.

TABLE 10

<!- - base - - >
<configuration>
    <setting>
        <ScanEnabled>true</ScanEnabled>
        <LogEnabled>false</LogEnabled>
    </setting>
</configuration>

The configuration element in TABLE 10 is passed to generate base tree operation 1105 that converts this XML string to a document object model (DOM) tree. Operation 1105 transfers to resolve collisions operation 1106.

As indicated above, the default collision detection name of a node in the DOM tree is its start tag name. Because the root nodes of the base and derived configuration DOM trees are both named "Configuration", there is always a collision. Thus, resolve collision process 1106 is initiated to form a merged configuration tree.

For each collision in the two DOM trees, the merged tree contains a node, copied from the base DOM tree node, with all of the children from both the base and derived DOM tree nodes, except that collisions among the immediate children nodes are resolved according to the collision resolution mode of the child node from the base DOM tree.

In one embodiment, there are four collision resolution modes, as presented in TABLE 11.

TABLE 11

| Resolution Mode | Meaning |
| --- | --- |
| Use Base | The base DOM tree node wins. The base tree DOM node, with its entire subtree, is added to the merged DOM tree. |
| Use Derived | The derived DOM tree node wins. The derived DOM tree node, with its entire subtree, is added to the merged DOM tree. |
| Accumulate | The base and derived DOM tree nodes are tied. Both the base DOM tree node and the derived tree DOM node, with their entire subtrees, are added to the merged DOM tree as separate nodes. |
| Merge | The base and derived DOM tree nodes are tied. The subtrees defined by the base DOM tree node and the derived DOM tree node are merged into a single subtree with a recursive application of the merge process. |

By default, the collision resolution mode of an element node is Merge, unless the node has no child entities, in which case the collision resolution mode is Use Derived. However, a specific mode may be assigned using a collision mode resolution attribute in the start tag.

The use of two default values may seem confusing, but it is designed to minimize the use of the collision mode resolution attribute override. Collision resolution mode Merge is the logical choice for the topmost start-tags, such as start-tag <Configuration> and start tag <Setting>. However, mode Merge is not practical to use for the bottommost tags, as this results in the concatenation of their text values. The default resolution modes are summarized in TABLE 12.

TABLE 12

| Element Type in DOM TREE | Default Collision Resolution Mode (See TABLE 11) |
| --- | --- |
| Non-leaf (tag with child tags) | Merge |
| Leaf (tag with no child tags) | Use Derived |

Hence, for the example of FIG. 10, the collision of the two configuration start tags results in a default resolution mode of Merge. Similarly, there is a collision between the setting start tags that results in a default resolution mode of Merge. There are no collisions between the settings in the two trees. Consequently, the effective tree is the merger of the two trees. Upon completion of resolve collisions operation 1106, processing returns to parent check operation 1103. Because configuration object 600 does not have a parent, check operation 1103 transfers to generate element operation 1107.

In generate element operation 1107, configuration servlet 820 generates an effective configuration XML string from the merged DOM tree that is presented in TABLE 13.

TABLE 13

<Configuration Name="Default" ProductID="3000"
  ProductVersion="1.0"
  Revision="20030701120700.000Z"
  SoftwareFeatureName="30009999">
  <ScanEnabled>true</ScanEnabled>
  <LogEnabled>false</LogEnabled>

TABLE 13-continued

<ForwardingServer>server2</ForwardingServer>
</Configuration>

Prior to considering techniques and processes to manage the element collisions further, a general description of the problem is first considered. As an example, consider a parent configuration object with a setting object that defines a list of IP addresses, the setting XML string is:

<!--base-->
<IP>1.0.0.0<IP>
<IP>2.0.0.0<IP>

A child configuration object is created and the list of IP addresses is changed to:

<!--derived-->
<IP>1.0.0.0</IP>
<IP>3.0.0.0</IP>

Looking at the two lists, it might be assumed that only the two 1.0.0.0 IP addresses collide but the 2.0.0.0 IP address and the 3.0.0.0 IP address do not collide. As indicated above, the name of the start tag is used in the collision resolution process by default. Thus, each item in the two lists is represented by a node in the DOM trees with the name "IP." Thus, the 1.0.0.0 IP address in the base configuration collides with all of the IP addresses in the derived configuration.

One solution to this counter-intuitive result is to name each node using a concatenation of the start tag name with the text between the start and end tags. With the naming method, the name of the nodes associated with the first elements in the base and derived configuration objects would be "IP1.0.0.0."

Hence, in one embodiment of this invention, a name attribute for a start tag includes a namespecifier that appends a literal string value to the start tag name to form the collision detection name. In this embodiment, the namespecifier supports operations on specified string values and the result of an operation or operations is appended to the start tag name.

One operation supported by the namespecifier is to append text. (See TABLE 15.) A second operation is to append the current element's child text. A third operation is to append the value of a specified attribute of the current element. A forth operation is to change the current element to a descendent of the current element, with optional parameters for matching attribute names or attribute name/value pairs. A fifth operation is concatenate two expressions.

Prior to presenting one embodiment of examples of syntax for generating various collision detection names, TABLE 14 presents the syntax for one embodiment of the namespecifier used in the name attribute using Backus-Naur Form notation.

TABLE 14

```
sesa-namespecifier ::= sesa-value *( "+" sesa-value )
sesa-value ::= literal-name
          / element-path
          / [element-path] value-selector
element-path ::= 1* tag-specifier
tag-specifier ::= "[" [tag-name] *(attribute
                                    specifier)]"
attribute-specifier ::= attribute-name "=" [ attribute-
                                              value ]
value-selector ::= attribute-value-selector
          / text-value-selector
attribute-value-selector ::= attribute-name "="
text-value-selector ::= "="
```

TABLE 14-continued

```
literal-name ::= <string>
tag-name ::= <string>
attribute-name ::= <string>
attribute-value ::= "" <string> ""
```

With this syntax for the namespecifier, TABLE 15 presents, a syntax, a description of the syntax, and an example of the syntax, and the resulting string that is appended to the start tag name for particular values of namespecifier.

TABLE 15

| Description | Syntax | Example | Result |
|---|---|---|---|
| literal name | "name" | <tag1 sesa-name="name"></tag1> | Name |
| current element text | "=" | <tag1 sesa-name="=">text1</tag1> | Text1 |
| current element attribute value | "attr=" | <tag1 attr1="value1" sesa-name="attr1="></tag1> | value1 |
| subelement | "[tag]" | <tag1 sesa-name="[tag2]"><tag2>text2</tag2></tag1> | tag2 |
| subelement text | "[tag]=" | <tag1sesa-name="[tag2]="><tag2>text2</tag2></tag1> | Text2 |
| subelement attribute value | "[tag]attr=" | <tag1 sesa-name="[tag2]attr2="><tag2 attr2="value2"></tag2></tag1> | value2 |
| sub-subelement text | "[tag] [tag] =" | <tag1 sesa-name="[tag2] [tag3]="><tag2><tag3>text3</tag3></tag2></tag1> | Text3 |
| sub-subelement attribute value | "[tag] [tag] attr=" | <tag1 sesa-name="[tag2] [tag3] attr3="><tag2><tag3 attr3="value3">text3</tag3></tag2></tag1> | value3 |
| Concatenation | value + value e.g. "[tag] + [tag]" "attr= + [tag]=" | <tag1 sesa-name="[tag2a]= + [tag2b]="><tag2a>text2a</tag2a><tag2b>text2b</tag2b></tag1> | text2a text2b |
| chaining | "[tag]" "[tag] [tag]" "[tag] [tag] [tag]" etc. where the last tag has a sesa-name | <tag1 sesa-name="[tag2]"><tag2 sesa-name="[tag3]="><tag3>text3</tag3></tag2></tag1> | text3 |
| element selection via attributes | "[tag attr=]" "[tag attr='value']" | <tag1 sesa-name="[tag2 attr='value2b']="><tag2 attr="value2a">text2 | text2b |

TABLE 15-continued

| Description | Syntax | Example | Result |
|---|---|---|---|
| | "[tag attr='value'," attr='value']" "[attr=]" "[attr='value']" "[attr='value' attr=value] " etc. | a</tag2><tag2 attr="value2b">text2 b</tag2></tag1> | |

Returning to the IP lists above, the collision can be controlled by using the name specifier in the name attribute of the start tag. Specifically, using the current text element namespecifier, the two lists are modified to read as shown below.

<!--base-->
<IP sesa-name="=">1.0.0.0</IP>
<IP sesa-name="=">2.0.0.0</IP>
<!--derived-->
<IP sesa-name="=">1.0.0.0</IP>
<IP sesa-name="=">3.0.0.0</IP>

The equality operator appends the element's text with the start tag name of the element. Thus, the collision detection names for the nodes in the DOM tree are:
!--base-->
IP1.0.0.0
IP2.0.0.0
<!--derived-->
IP1.0.0.0
IP3.0.0.0

Hence, only the 1.0.0.0 IP address results in a collision because the start tag collision detection name is the same in the based and derived trees.

While parent-child inheritance merge process 1100 was described above for configuration objects, the process works on any XML text. Managed products that need to guide the behavior of the parent-child inheritance merge process may annotate the start-tags in their setting XML strings using attributes in TABLE 16. In particular, a collision resolution mode attribute sesa-resolve is used to specify the collision resolution mode for a particular node.

TABLE 16

| Attribute/Value | Meaning |
|---|---|
| sesa-name="namespecifier" | Append the value of namespecifier to the tag name to form the tag's collision detection name, instead of using the tag name alone. |
| sesa-resolve="usebase" | Set the Resolution Mode of the tag to Use Base. |
| sesa-resolve="usederived" | Set the Resolution Mode of the tag to Use Derived. |
| sesa-resolve="accumulate" | Set the Resolution Mode of the tag to Accumulate. |
| sesa-resolve="merge" | Set the Resolution Mode of the tag to Merge. |

Attribute sesa-resolve only affects the collision resolution mode of the start-tag with the attribute, and not any of the child start-tags of that start-tag. There are still cases where it is desirable to have multiple elements with the same collision detection name in a configuration. For example, a managed product might allow multiple alert messages:

<AlertMessage sesa-resolve="accumulate">Uh-oh!</AlertMessage>
<AlertMessage sesa-resolve="accumulate">Drat!</AlertMessage>

Here it is appropriate that all the elements are named "AlertMessage".

To further demonstrate parent-child inheritance merge process 1100 (FIG. 11) and the use of the collision resolution modes, the collision resolution modes attribute, and the namespecifier in the name attribute, a more complex example is considered. This example is intended to demonstrate the various embodiments of this invention and is not intended to represent a configuration for a practical system. Accordingly, the example is illustrative only and is not intended to limit the invention to the specific embodiments described.

In this embodiment, the configuration inheritance chain includes two configuration objects. In get trunk object and setting objects operation 1101, the most derived configuration object and its settings are retrieved from directory 116. XML string 1200 (FIG. 12) is generated in operation 1101.

Using XML string 1200, generate derived tree operation 1102, creates a DOM tree. In FIG. 12, each start tag, and each text element of a tag pair is assigned a reference numeral. The first two digits of a reference numeral represent the figure number. The last three digits are representative of a particular start tag or text element. The third digit in the reference numeral is indicative of the depth of the start tag or text element.

Figure 13A:
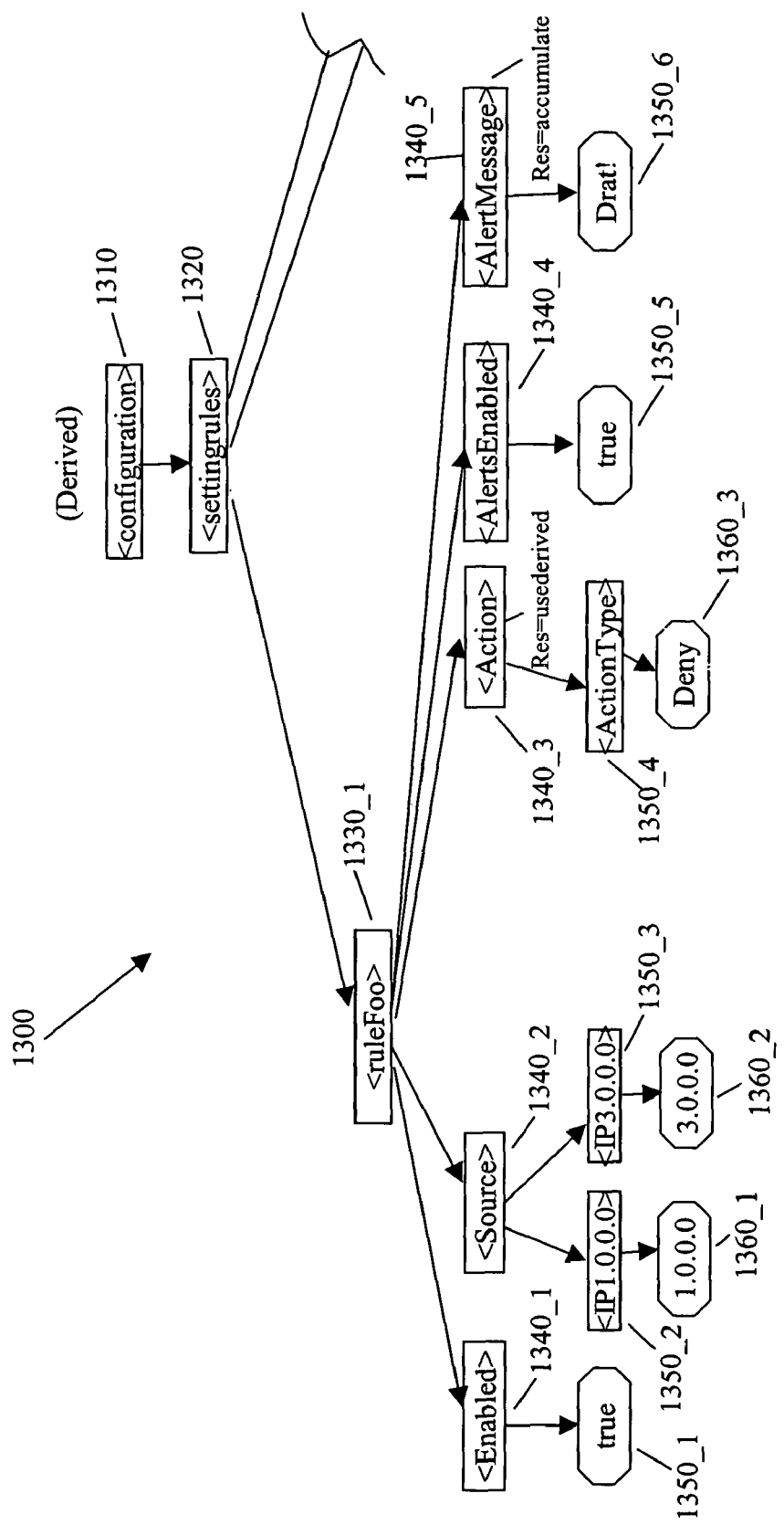
FIGS. 13A and 13B are a graphical representation of a DOM tree corresponding to the XML string of FIG. 12, a derived DOM tree, with the collision detection names corresponding to start tags in the XML strings presented in the nodes associated with elements having the start tag according to one embodiment of the present invention.
Figure 13B:
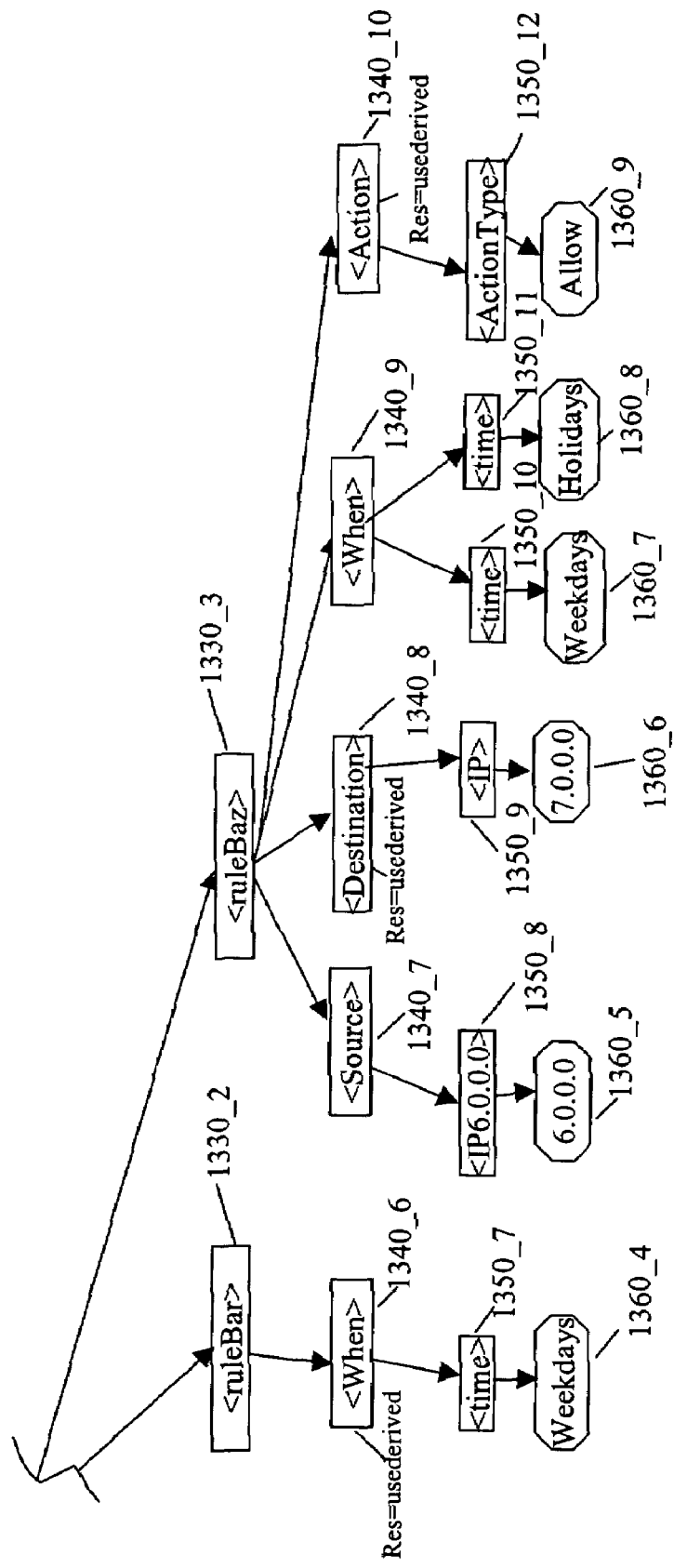

A graphic representation of the DOM tree is presented as DOM tree 1300 in FIGS. 13A and 13B. The generation of a DOM tree from an XML string is known to those of skill in the art. In FIGS. 13A and 13B, the node reference numeral is the figure number, plus the last three digits of the corresponding start tag or text element reference numeral in FIG. 12.

In FIGS. 13A and 13B, the collision detection name for the corresponding start tag of XML string 1200 is given in the node. Specifically, configuration start tag 1210 is represented by node 1310 with collision detection name "configuration," which is the start tag name. Setting start tag 1220 is represented by node 1320 that has a collision detection name of "setting rules." This is because the name attribute is used with a literal name namespecifier of "rules" that is appended to the setting start tag name.

Node 1330_1 represents rule start tag 1230_1 and has a collision detection name of "ruleFoo". This is because the name attribute is used in rule start tag 1230_1 with a literal name namespecifier of "Foo" that is appended to the rule start tag name.

Node 1330_2 (FIG. 13B) represents rule start tag 1230_2 and has a collision detection name of "ruleBar". This is because the name attribute is used in rule start tag 1230_2 with a literal name namespecifier of "Bar" that is appended to the rule start tag name.

Node 1330_3 (FIG. 13B) represents rule start tag 1230_3 and has a collision detection name of "ruleBaz". This is because the name attribute is used in rule start tag 1230_2 with a literal name namespecifier of "Baz" that is appended to the rule start tag name.

Rule start tag 1230_1 has five child start tags 1240_1 to 1240_5 with corresponding child nodes 1340_1 to 1340_5 of parent node 1330_1 (FIG. 13A). The collision detection names of nodes 1340_1 to 1340_5 are Enabled, Source, Action, AlertsEnabled, and AlertMessage, respectively, which are the default names Source start tag 1240_2 has two child start tags 1250_2 and 1250_3 with corresponding child nodes 1350_2 and 1350_3 of node 1340_2. Nodes 1350_2 and 1350_3 have the collision detection names of IP1.0.0.0 and IP3.0.0.0, respectively. This is because the name attribute is used in both IP start tag 1250_2 and 1250_3 with a current element text namespecifier of "=" that appends the current element text to the IP start tag name. (See TABLE 15.) All other nodes 1340_1, 1340_3 to 1340_5, 1350_1, 1350_4 to 1350_6, and 1360_1 to 1360_3 related to node 1330_1 have default names based upon the corresponding start tag or text element.

Rule start tag 1230_2 (FIG. 12A) has one child start tag 1240_6 with corresponding child nodes 1340_6 (FIG. 13B) of parent node 1330_2. The collision detection names of nodes 1340_6, and 1350_7 are when and time, respectively, which are the default names. Node 1360_4 is text element "Weekdays."

Rule start tag 1230_3 (FIG. 12A) has four child start tags 1240_7 to 1240_10 with corresponding child nodes 1340_7 to 1340_10 (FIG. 13B) of parent node 1330_3. The collision detection names of nodes 1340_1 to 1340_5 are Source, Destination, When, and Action, respectively, which are the default names.

Source start tag 1240_7 has one child start tag 1250_8 with a corresponding child node 1350_8 of node 1340_7. Node 1350_8 has the collision detection name of IP6.0.0.0. This is because the name attribute is used in IP start tag 1250_8 with a current element text namespecifier of "=" that appends text element 1260_6 to the IP start tag name. All other nodes 1340_8 to 1340_10, 1350_9 to 1350_12, and 1360_6 to 1360_9 have default names based upon the corresponding start tag or text. If a node includes collision resolution mode attribute sesa-resolve, the resolution mode for that node is shown in FIGS. 13A and 13B.

Because a parent configuration object is available, parent check operation 1103 (FIG. 11) transfers processing to get parent and setting objects operation 1104. In get parent object and setting objects operation 1104, the base configuration object and its settings are retrieved from directory 116. XML string 1400 (FIG. 14) is generated in operation 1104. In FIG. 14, each start tag, and each text element of a tag pair is assigned a reference numeral. The first two digits of a reference numeral represent the figure number. The last three digits are representative of a particular start tag or text element. The third digit in the reference numeral is indicative of the depth of the start tag or text element.

Figure 15A:
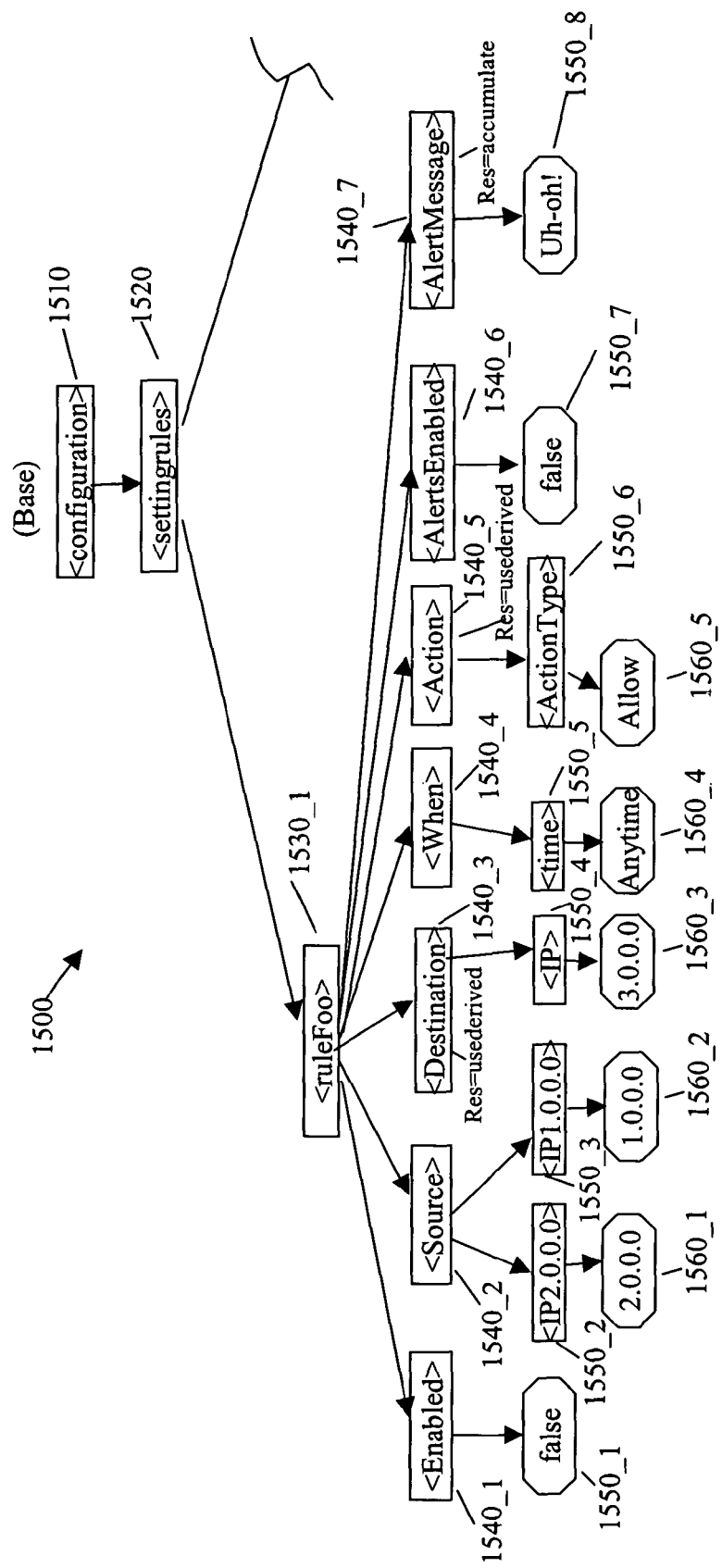
FIGS. 15A and 15B are a graphical representation of a DOM tree corresponding to the XML string of FIG. 14, a base DOM tree with the collision detection names corresponding to start tags in the XML strings presented in the nodes associated with elements having the start tag according to one embodiment of the present invention.
Figure 15B:
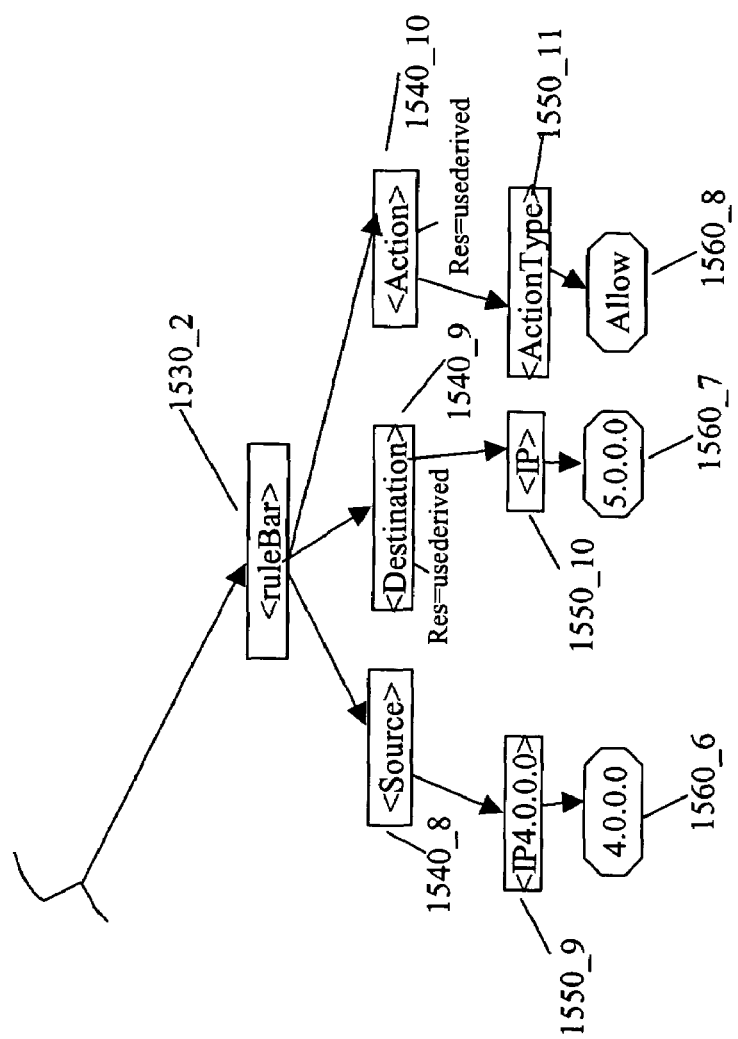
Figure 16A:
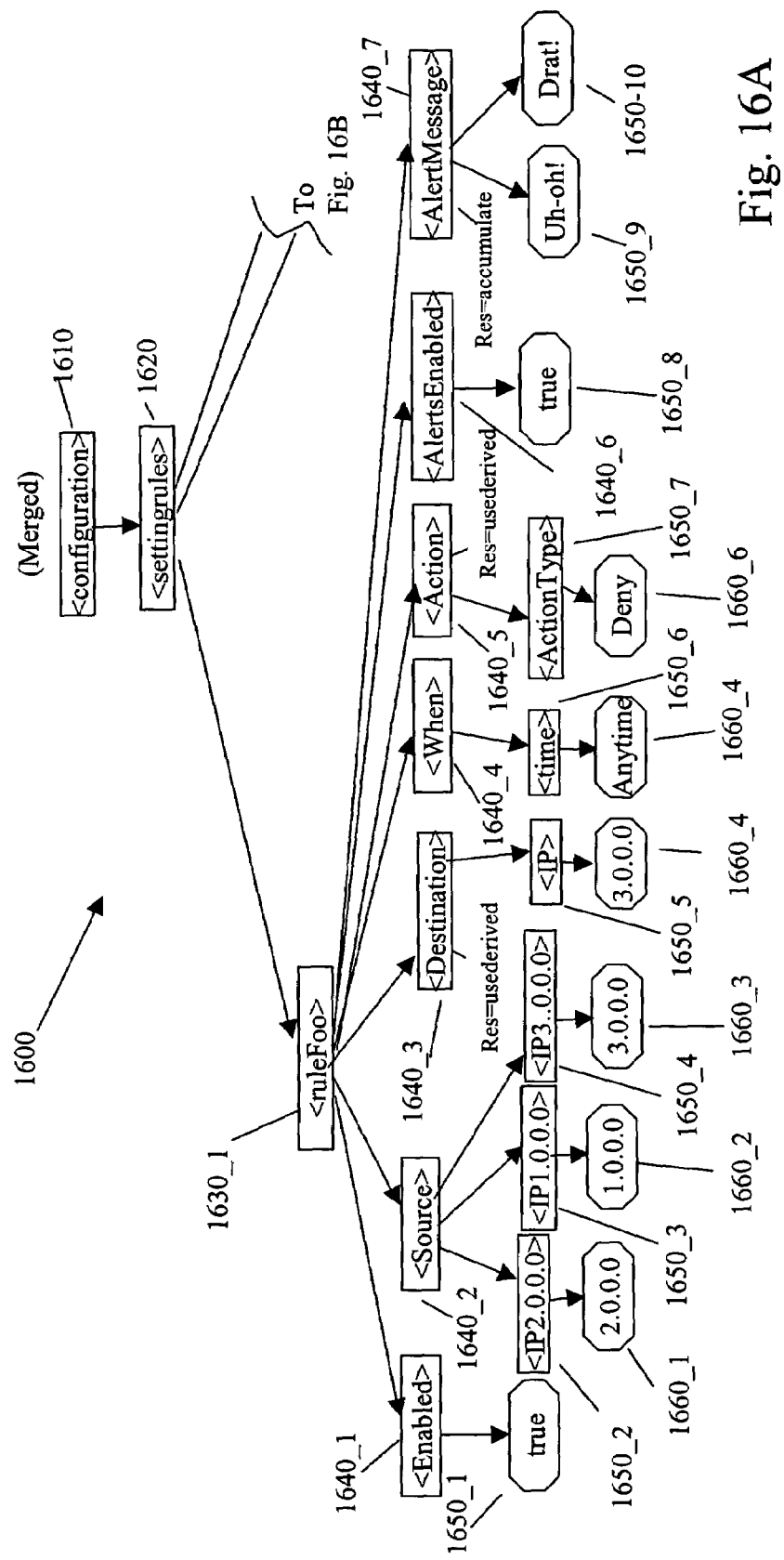
FIGS. 16A and 16B are a graphical representation of a DOM tree corresponding to combination of the derived and base DOM tree using collision resolution modes to resolve collisions between nodes with the same collision detection names according to one embodiment of the present invention.
Figure 16B:
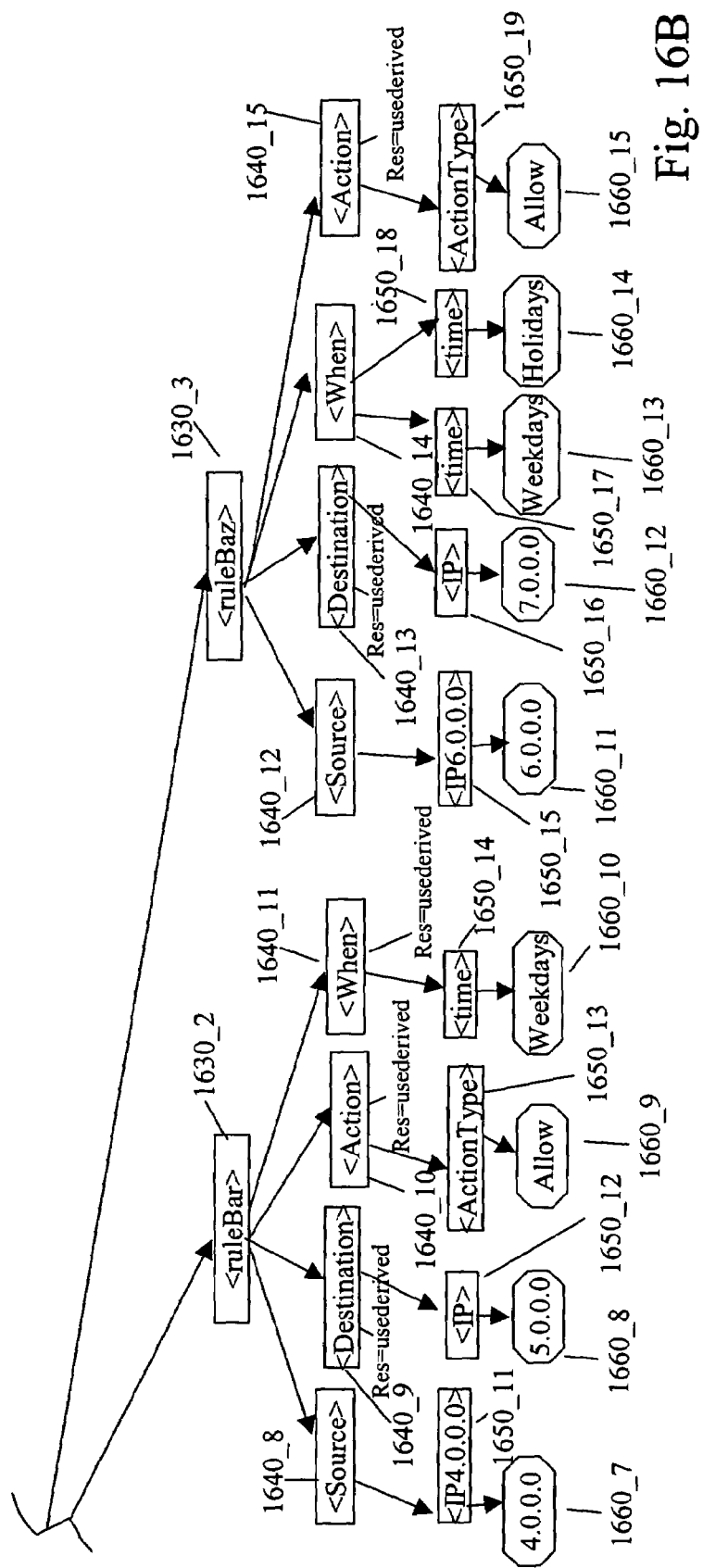

Using XML string 1400, generate base tree operation 1104 creates a DOM tree. A graphic representation of the DOM tree is presented as DOM tree 1500 in FIGS. 15A and 15B. In FIGS. 15A and 15B, the node reference numeral is the figure number, plus the last three digits of the corresponding start tag or text element reference numeral in FIG. 14. In FIGS. 15A and 15B, if a node includes attribute sesa-resolve, the resolution mode for that node is shown.

In FIGS. 15A and 15B, the collision detection name for each start tag of the XML string 1400 is given in the node. Configuration start tag 1410 is represented by node 1510 with collision detection name "configuration," which is the start tag name. Setting start tag 1420 is represented by node 1520 that has a collision detection name of "setting rules." This is because the name attribute is used a literal name namespecifier of "rules" that is appended to the setting start tag name.

Node 1530_1 represents rule start tag 1430_1 and has a collision detection name of "ruleFoo". This is because the name attribute is used in rule start tag 1430_1 with a literal name namespecifier of "Foo" that is appended to the rule start tag name.

Node 1530_2 represents rule start tag 1430_2 and has a collision detection name of "ruleBar". This is because the name attribute is used in rule start tag 1430_2 with a literal name namespecifier of "Bar" that is appended to the rule start tag name.

Rule start tag 1430_1 has seven child start tags 1440_1 to 1440_7 with corresponding child nodes 1540_1 to 1540_7 of parent node 1530_1. The collision detection names of nodes 1540_1 to 1540_7 are Enabled, Source, Destination, When, Action, AlertsEnabled, and AlertMessage, respectively, which are the default names Source start tag 1440_2 has two child start tags 1450_2 and 1450_3 with corresponding child nodes 1550_2 and 1550_3 of node 1540_2. Nodes 1550_2 and 1550_3 have the collision detection names of IP2.0.0.0 and IP1.0.0.0, respectively. This is because the name attribute is used in both IP start tag 1450_2 and 1450_3 with a current element text namespecifier of "=" that appends the text element of the tag to the IP start tag name. All other nodes 1540_1, 1540_3 to 1540_7, 1550_1, 1550_4 to 1550_8, and 1560_1 to 1560_5 have default names based upon the corresponding start tag or text.

Rule start tag 1430_2 (FIG. 14) has three child start tags 1440_8 to 1440_10 with corresponding child nodes 1540_8 to 1540_10 (FIG. 15B) of parent node 1530_2. The collision detection names of nodes 1540_8 to 1540_10 are Source, Destination and Action, respectively, which are the default names.

Source start tag 1440_8 has one child start tag 1450_9 with a corresponding child node 1550_9 of node 1540_9. Node 1550_9 has the collision detection name of IP4.0.0.0. This is because the name attribute is used in IP start tag 1450_9 with a current element text namespecifier of "=" that appended the text element of the tag to the IP start tag name. All other nodes 1550_10 to 1550_11 and 1560_6 to 1560_8 have default names based upon the corresponding start tag or text. If a node includes attribute sesa-resolve, the resolution mode for that node is shown in FIGS. 15A and 15B.

Because both derived DOM tree 1300 and base DOM tree 1500 start with a node with collision detection name of "configuration," resolve collision operation 1106 processes the two trees to form a merged tree with collisions between nodes at the same depth with the same collision detection name being processed using the default node as defined in TABLE 12 unless the collision resolution mode is specified in an attribute in the node. Specifically, the configuration nodes have child tag nodes and do not specify a collision resolution mode. Thus, the default resolution mode of merge is used.

Nodes named "settingrules" in FIGS. 13A and 15A collide and each has child tag nodes, default collision resolution mode merge is used. The two nodes are merged as node 1620 in tree 1600.

The merger of node named "RuleFoo" produces another collision because both trees 1300 and 1500 have nodes named "RuleFoo." Again, because nodes "RuleFoo" have child tag nodes, the collision resolution mode merge is used. Consequently, the child nodes of nodes "RuleFoo" in both FIGS. 13A and 15A are added to DOM tree 1600 as nodes 1640_1 to 1640_7 respectively, with collisions handled using either the default collision resolution mode unless a collision resolution mode is specified for nodes that collide.

Nodes 1340_1 and 1540_1 both have a collision detection name of "Enabled." However, these nodes do not have child tag nodes and so the collision resolution mode of Use Derived is used. Therefore, node 1340_1 is added to DOM tree 1600 as node 1640_1.

Nodes 1340_2 and 1540_2 both have a collision detection name of "Source." Both of these nodes have child tag nodes and so the collision resolution mode of merge is used. The child nodes of both nodes are added to tree 1600 with any collisions resolved using the appropriate collision resolution mode.

Nodes 1550_2 and 1350_3 are uniquely named and so do not collide. Thus, nodes 1550_2 and 1350_3 are added to DOM tree 1600 as nodes 1650_2 and 1650_4, respectively.

Nodes 1350_2 and 1550_3 collide because both are at the same depth and have the same collision detection name "IP1.0.0.0." Nodes 1350_2 and 1550_3 do not have child tag nodes and so the default collision resolution mode is Use Derived. Therefore, node 1350_2 is added to tree 1600 as node 1650_3.

Node 1540_3 does not experience a collision and so is added to tree 1600 as node 1640_3 with its child node that becomes node 1650_5. Similarly, node 1540_4 does not experience a collision and so is added to tree 1600 as node 1640_4 with its child node that becomes node 1650_6.

Nodes 1540_5 and 1340_3 have the same collision detection name "Action" and are at the same depth. Thus, nodes 1540_5 and 1340_3 collide. Because nodes 1540_5 and 1340_3 have child tag nodes, the default collision resolution mode is merge. However, the nodes include the collision resolution attribute set to Use Derived, which overrides the default mode. Consequently, node 1340_3 with its child node 1350_4 is added to DOM tree 1600 as nodes 1640_5 and 1650_6, respectively.

Nodes 1340_4 and 1540_6 collide because both are at the same depth and have the same collision detection name "AlertsEnabled." Nodes 1340_4 and 1540_6 do not have child tag nodes and so the default collision resolution mode is Use Derived. Therefore, node 1340_4 is added to tree 1600 as node 1640_6.

Nodes 1540_7 and 1340_5 have the same collision detection name "AlertMessage" and are at the same depth. Thus, nodes 1540_7 and 1340_5 collide. Because nodes 1540_7 and 1340_7 do not have child tag nodes, the default collision resolution mode is Use Derived. However, the nodes include the collision resolution attribute set to Accumulate, which overrides the default mode. Consequently, node 1540_7 and 1340_5 are combined to form node 1640_7 in DOM tree 1600. This concludes the collision resolution process for node named "ruleFoo" and so processing goes to the nodes named "ruleBar."

Nodes 1330_2 and 1530_2 have the same collision detection name "ruleBar" and the same depth. Nodes 1330_2 and 1530_2 collide. The collision resolution mode is merge, because both nodes have child tag nodes. Thus, the child nodes of both nodes are added to DOM tree 1600 with the collision resolution process used to resolve any collisions. However, each of the child nodes has a unique collision detection name and the child nodes of nodes 1330_2 and 1530_2 are added to DOM tree 1600 as nodes 1640_8 to 1640_11, 1650_11 to 1650_14, and 1660_7 to 1660_10.

Node 1330_3 that has collision detection name "ruleBaz" does not collide with any nodes of DOM tree 1500 at the same depth. Consequently, node 1330_3 and all of its child nodes are added to DOM tree 1600 as nodes 1630_3, 1640_12 to 1640_15, 1650_15 to 1650_19, and 1660_11 to 1660_15.

Upon returning to parent check operation, there are no parent objects and so check operation 1103 transfers to generate element operation 1107. Using DOM tree 1600, operation 1107 generates XML string 1700 of FIGS. 17A and 17B.

If there had been a parent configuration object, DOM tree 1600 would have been used as the derived DOM tree and a DOM tree generated for the parent configuration object. The collision resolution process would them be performed on these two DOM trees.

In the above example, default collision resolution modes were defined for an inheritance chain. This is illustrative only of the principles of this invention and is not intended to limit the invention to these specific embodiments. In view of this disclosure, inheritance chains can be defined for other types of objects that utilize collision-mode-resolution attributes and name attributes with a namespecifier value. Default collision resolution modes would be defined for these objects that preserved the inheritance state of interest.

In some situations, a single top-level tag may be used in the setting objects' XML data strings. If multiple setting objects for a configuration object use the same top-level tag name, parent-child inheritance merge process 1100 may produce counterintuitive results.

For example, assume that a flat list of properties was stored in each setting object using a standard CIM XML encoding. Each setting object contains an XML string similar to that presented in TABLE 17.

TABLE 17

```
<objects>
    <instance sesa-name="i1">
        <property sesa-name="p1" sesa-
            resolve="usederived">base</property>
        <property sesa-name="p2" sesa-
            resolve="usederived">base</property>
    </instance>
    <instance sesa-name="i2">
        <property sesa-name="p1" sesa-
            resolve="usederived">base</property>
        <property sesa-name="p2" sesa-
            resolve="usederived">base</property>
        <property sesa-name="p3" sesa-
            resolve="usederived">base</property>
    </instance>
</objects>
```

The XML strings for both the base and derived configuration objects take the form presented in TABLE 18.

TABLE 18

```
<Configuration>
    <objects>
        <instance sesa-name="i1">
            <property sesa-name="p1" sesa-
                resolve="usederived">base</property>
            <property sesa-name="p2" sesa-
                resolve="usederived" >base</property>
        </instance>
        <instance sesa-name="i2">
            <property sesa-name="p1" sesa-
                resolve="usederived">base</property>
            <property sesa-name="p2" sesa-
                resolve="usederived">base</property>
            <property sesa-name="p3" sesa-
                resolve="usederived">base</property>
        </instance>
    </objects>
    <objects>
        <instance sesa-name="i1">
            <property sesa-name="p1" sesa-
```

TABLE 18-continued

```
                resolve="usederived">base</property>
            <property sesa-name="p2" sesa-
                resolve="usederived">base</property>
        </instance>
        <instance sesa-name="i2">
            <property sesa-name="p1" sesa-
                resolve="usederived">base</property>
            <property sesa-name="p2" sesa-
                resolve="usederived">base</property>
            <property sesa-name="p3" sesa-
                resolve="usederived">base</property>
        </instance>
    </objects>
    . . .
</Configuration>
```

It might be expected that instance tags with identical collision detection names in the base and derived configurations would collide and be resolved, independent of the particular objects tag in which the instance tag appeared. For example, an instance tag with collision detection name "instancei1" might appear in the first object's tag in the base configuration but in the second object's tag in the derived configuration. However, in one embodiment, parent-child inheritance merge process 1100 does not compare every object's tag collision detection name in the base configuration with the collision detection name of every objects tag in the derived configuration, because that would be extremely inefficient.

The collision detection process is recursive. At each stage of recursion, the process uses one node from the base configuration XML DOM tree and one node from the derived configuration XML DOM tree that are known to have collided. The process also knows the resolution mode to use for these two nodes. Suppose the mode is "merge". The process must look for further collisions among the immediate children of these two nodes. So for each child of the base tree node, a name comparison is made with each child of the derived tree node. In the above example, the user wants the process to detect collisions among certain child nodes when the parent nodes of those children do not themselves have a name collision. To support this without using a collapse attribute sesa-collapse, as described below, the process would have to compare a child node from one tree with every descendent node (child, grandchild, great-grandchild, etc.) in the other tree, possibly subject to some kinds of restraints. This is not only more expensive in terms of computation time, but would likely result in more counterintuitive behavior from unexpected node collisions. Use of the collapse attribute sesa-collapse gets around this problem by causing a merge of identically named XML tags among settings in a configuration, prior to checking that configuration against its parent or child configuration. Without this attribute, the merged parent-child configuration could have multiple copies of an element when it was supposed to get only one copy or the other.

The solution to this problem is the collapse attribute sesa-collapse. When collapse attribute sesa-collapse is used, as described below in TABLE 19, the sibling elements with identical values of attribute sesa-name are collapsed into one element. This attribute only works on the elements immediately below top configuration tag <Configuration>, which are the top level Setting tags. This processing is done before any inheritance takes place. It is the last step in preparing the XML string built from setting objects' data strings for a configuration object.

TABLE 19

| Attribute/Value | Meaning |
| --- | --- |
| sesa-collapse="true" or sesa-collapse="1" | Collapse sibling elements with identical values of name attribute sesa-name into a single element prior to performing inheritance. This attribute is restricted to top level setting elements. |

When this attribute is used, a configuration using the settings
```
<objects sesa-collapse="true">
    <instance sesa-name="i1">
        . . .
    </instance>
    <instance sesa-name="i2">
        . . .
    </instance>
</objects>
and
<objects sesa-collapse="true">
    <instance sesa-name="i3">
        . . .
    </instance>
</objects>
```
has an effective configuration string with only one tag <objects> instead of two, as shown below:
```
<configuration . . . >
<objects sesa-collapse="true">
    <instance sesa-name="i1">
        . . .
    </instance>
    <instance sesa-name="i2">
        . . .
    </instance>
    <instance sesa-name="i3">
        . . .
    </instance>
</objects>
</Configuration>
```
If a setting XML data string begins with <?xml> and/or <!DOCTYPE> declarations, the declaration is automatically removed before the string is included in any configuration XML string.

In one embodiment, configuration objects and setting object are stored in a non-volatile memory of security management system 150 and moved from non-volatile memory to volatile memory as necessary for use with security management system 150. Suitable hardware configurations for utilizing security management system 150 include a personal computer, a workstation, a portable device such as a cellular telephone or a personal digital assistant, an Internet appliance, or any other device that includes components that can include a managed product and a security management agent in accordance with at least one of the embodiments as described herein.

In view of this disclosure, configuration objects and setting objects in accordance with one embodiment of present invention can be implemented in a wide variety of computer system configurations. In addition, the various elements used with this objects and the objects could be stored in memories of different devices. For example, configuration objects could initially be stored in a first server system, and then as necessary, a configuration objects and its setting object could be transferred to a second computer system and processed on the second computer system. Additional configuration objects, e.g., parent configuration objects and their configurations objects could be retrieved from the first computer system.

In view of this disclosure, those of skill in the art can implement various embodiments of the present invention in a wide-variety of physical hardware configurations and network configurations.

As used herein, a computer memory refers to a volatile memory, a non-volatile memory, or a combination of the two. Herein, a computer program product comprises a medium configured to store or transport computer readable code in accordance with an embodiment of the present invention. The computer readable code could be for all or any part of the various embodiments of the methods and object used with the configuration and security objects. Some examples of computer program products are CD-ROM discs, DVDs, ROM cards, floppy discs, magnetic tapes, computer hard drives, servers on a network and signals transmitted over a network representing computer readable code.

The medium may belong to the computer system itself. However, the medium also may be removed from the computer system. This could be accomplished in a client-server system, or alternatively via a connection to another computer via modems and analog lines, or digital interfaces and a digital carrier line.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

We claim:

1. A computer implemented method for generating an effective configuration for a managed product comprising:
    generating a configuration object for a managed product, said configuration object specifying a configuration for said managed product, said configuration object representing a certain behavior or desired functional state for a software feature of said managed product;
    generating a derived configuration object of said configuration object, said derived configuration object representing a modification to said configuration for said managed product;
    wherein said configuration object and said derived configuration object comprise a configuration object inheritance chain; and
    processing said configuration object inheritance chain using a parent-child inheritance merge process to obtain an effective configuration for said managed product,
    wherein said parent-child inheritance merge process resolves collisions between elements of said configuration object and elements of said derived configuration object having the same collision detection name and merges the configuration object and said derived configuration object to obtain a merged configuration.

2. A computer implemented method for generating an effective configuration for a managed product from a configuration object inheritance chain comprising:
    obtaining a configuration object inheritance chain for a managed product, said configuration object inheritance chain comprising:

a configuration object, said configuration object representing a certain behavior or desired functional state for a software feature of said managed product; and a derived configuration object of said configuration object, said derived configuration object representing a modification to said configuration for said managed product;

obtaining a mark-up language string for a most-derived configuration object;

converting said mark-up language string for said most-derived configuration object to a derived tree structure having nodes wherein a plurality of nodes in said derived tree structure include collision detection names;

obtaining a mark-up language string for a parent configuration object of said most-derived configuration object;

converting said mark-up language string for said parent configuration object to a base tree structure having nodes wherein a plurality of nodes in said base tree structure include collision detection names; and combining said derived tree structure and said base tree structure, by resolving at least one collision between a node in the derived tree structure having a collision detection name and a node in the base tree structure having said collision detection name, to form a merged tree structure.

3. The computer implemented method of claim 2 wherein a collision detection name for a node in said plurality of nodes is a name of a start tag when said start tag does not include a name attribute.

4. The computer implemented method of claim 2 wherein a collision detection name for a node in said plurality of nodes is combination of a name of a start tag and a string determined by a namespecifier when said start tag includes a name attribute with said namespecifier.

5. The computer implemented method of claim 2 wherein resolving at least one collision between a node in the derived tree structure having a collision detection name and a node in the base tree structure having said collision detection name further comprises:

merging said nodes to form a node of said merged tree when said nodes have child nodes.

6. The computer implemented method of claim 2 wherein resolving at least one collision between a node in the derived tree structure having a collision detection name and a node in the base tree structure having said collision detection name further comprises:

copying said node in the derived tree structure to said merged tree when said nodes are leaf nodes.

7. The computer implemented method of claim 2 wherein resolving at least one collision between a node in the derived tree structure having a collision detection name and a node in the base tree structure having said collision detection name further comprises:

selecting a combination of said nodes to form a node of said merged tree based upon a value of a collision resolution mode attribute in a start tag for an element corresponding to one of said nodes.

8. The computer implemented method claim 7 where said value of said collision resolution mode attribute is merge.

9. The computer implemented method claim 7 where said value of said collision resolution mode attribute is use base.

10. The computer implemented method claim 7 where said value of said collision resolution mode attribute is use derived.

11. The computer implemented method claim 7 where said value of said collision resolution mode attribute is accumulate.

12. The computer implemented method of claim 2 wherein said obtaining a mark-up language string for a most-derived configuration object includes:

collapsing sibling elements with identical values of a name attribute into a single element.

13. A computer-program product comprising a computer-readable storage medium containing computer program code for a method for generating an effective configuration for a managed product comprising:

generating a configuration object for a managed product, said configuration object specifying a configuration for said managed product, said configuration object representing a certain behavior or desired functional state for a software feature of said managed product;

generating a derived configuration object of said configuration object, said derived configuration object representing a modification to said configuration for said managed product, wherein said configuration object and said derived configuration object comprise a configuration object inheritance chain; and processing said configuration object inheritance chain using a parent-child inheritance merge process to obtain an effective configuration for said managed product wherein said parent-child inheritance merge process resolves collisions between elements of said configuration object and elements of said derived configuration object having the same collision detection name and merges the configuration object and said derived configuration object to obtain a merged configuration.

14. An apparatus for generating an effective configuration for a managed product, said apparatus comprising:

a memory having stored therein at least a portion of an application for generating an effective configuration for a managed product, said application comprising:

means for generating a configuration object for a managed product, said configuration object specifying a configuration for said managed product, said configuration object representing a certain behavior or desired functional state for a software feature of said managed product;

means for generating a derived configuration object of said configuration object, said derived configuration object representing a modification to said configuration for said managed product, wherein said configuration object and said derived configuration object comprise a configuration object inheritance chain; and means for processing said configuration object inheritance chain using a parent-child inheritance merge process to obtain an effective configuration for said managed product wherein said parent-child inheritance merge process resolves collisions between elements of said configuration object and elements of said derived configuration object having the same collision detection name and merges the configuration object and said derived configuration object to obtain a merged configuration.

* * * * *

UNITED STATES PATENT AND TRADEMARK OFFICE
CERTIFICATE OF CORRECTION

| | |
|---|---|
| PATENT NO. | : 7,383,534 B1 |
| APPLICATION NO. | : 10/660422 |
| DATED | : June 3, 2008 |
| INVENTOR(S) | : Paul M. Agbabian and David R. Hertel |

Page 1 of 1

It is certified that error appears in the above-identified patent and that said Letters Patent is hereby corrected as shown below:

In Column 37, Claim 8, Line 59, replace "method claim 7" with --method of claim 7--.
In Column 37, Claim 9, Line 61, replace "method claim 7" with --method of claim 7--.
In Column 37, Claim 10, Line 63, replace "method claim 7" with --method of claim 7--.
In Column 38, Claim 11, Line 1, replace "method claim 7" with --method of claim 7--.

Signed and Sealed this

Thirtieth Day of September, 2008

JON W. DUDAS
*Director of the United States Patent and Trademark Office*